US012682683B2

(12) United States Patent
Liu et al.

(10) Patent No.: US 12,682,683 B2
(45) Date of Patent: Jul. 14, 2026

(54) METHOD FOR PREVENTING HAND GESTURE MISRECOGNITION AND ELECTRONIC DEVICE

(71) Applicant: HUAWEI TECHNOLOGIES CO., LTD., Shenzhen (CN)

(72) Inventors: Xiaomeng Liu, Shenzhen (CN); Xiaohan Chen, Shenzhen (CN); Lei Huang, Shenzhen (CN); Jie Zhao, Shenzhen (CN); Chunhui Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 545 days.

(21) Appl. No.: 18/250,225

(22) PCT Filed: Nov. 5, 2021

(86) PCT No.: PCT/CN2021/129134
§ 371 (c)(1),
(2) Date: Apr. 24, 2023

(87) PCT Pub. No.: WO2022/095983
PCT Pub. Date: May 12, 2022

(65) Prior Publication Data
US 2023/0401897 A1 Dec. 14, 2023

(30) Foreign Application Priority Data

Nov. 6, 2020 (CN) .......................... 202011230632.9

(51) Int. Cl.
*G06V 40/20* (2022.01)
*G06V 40/16* (2022.01)

(52) U.S. Cl.
CPC ............ *G06V 40/23* (2022.01); *G06V 40/172* (2022.01); *G06V 40/28* (2022.01)

(58) Field of Classification Search
CPC ....... G06V 40/23; G06V 40/172; G06V 40/28
See application file for complete search history.

(56) References Cited

U.S. PATENT DOCUMENTS

2011/0039659 A1* 2/2011 Kim ................... A63B 24/0006
482/8
2013/0266182 A1* 10/2013 Shotton ..................... G06T 7/50
382/103

(Continued)

FOREIGN PATENT DOCUMENTS

| CN | 110472396 A | 11/2019 |
| CN | 112019868 A | 12/2020 |
| WO | 2013063767 A1 | 5/2013 |

*Primary Examiner* — Wassim Mahrouka

(57) ABSTRACT

A method for preventing hand gesture misrecognition is provided. In the method for preventing hand gesture misrecognition, whether a user is exercising is recognized by obtaining motion data of the user in real time, to choose whether to disable a hand gesture recognition function. If the object user is exercising, the electronic device does not perform hand gesture recognition; or if the object user is not exercising, the electronic device performs hand gesture recognition. In addition, in the method, a trigger threshold for hand gesture recognition may further be adaptively adjusted based on a deflection angle between a human body plane of the user and a plane on which the electronic device is located.

14 Claims, 18 Drawing Sheets

(56)　　　　　References Cited

U.S. PATENT DOCUMENTS

| 2013/0278504 | A1* | 10/2013 | Tong | ...................... | G06V 40/28 |
| | | | | | 345/158 |
| 2015/0099252 | A1* | 4/2015 | Anderson | ............... | G06T 7/251 |
| | | | | | 434/257 |
| 2019/0182415 | A1* | 6/2019 | Sivan | ...................... | G06F 3/013 |
| 2022/0261084 | A1* | 8/2022 | Hong | ...................... | G06F 3/012 |

\* cited by examiner (a)

| Sequential<br>motion clip 1 | Sequential<br>motion clip 2 | Sequential<br>motion clip 3 | Sequential<br>motion clip 4 | Sequential<br>motion clip 5 |
|---|---|---|---|---|

(b)

| Sequential motion clip 1 | Sequential motion clip 2 | Sequential motion clip 3 | Sequential motion clip 4 | Sequential motion clip 5 |

(a)

| Motion posture 1 | Motion posture 2 | Motion posture 3 | Motion posture 4 | Motion posture 5 |

(b)

2D skeleton key point map 3D skeleton key point map (x1, y1)

(X1, Y1, Z1)

Y

X

Z (a)                    (b)                    (c)

y: Trigger threshold 0.5

0          90          180   x: Deflection angle

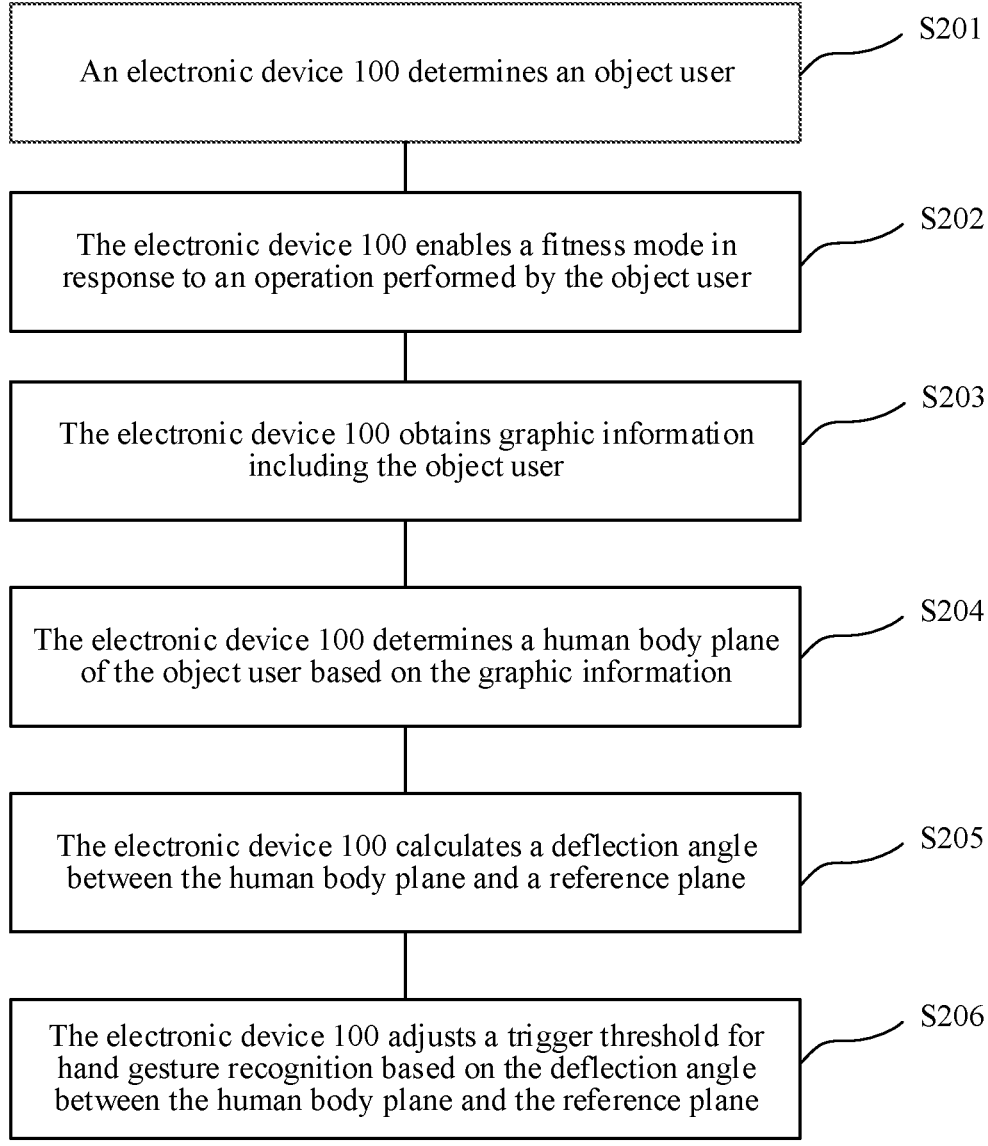

S201

An electronic device 100 determines an object user

S202

The electronic device 100 enables a fitness mode in response to an operation performed by the object user

S203

The electronic device 100 obtains graphic information including the object user

S204

The electronic device 100 determines a human body plane of the object user based on the graphic information

S205

The electronic device 100 calculates a deflection angle between the human body plane and a reference plane

S206

The electronic device 100 adjusts a trigger threshold for hand gesture recognition based on the deflection angle between the human body plane and the reference plane

FIG. 18

METHOD FOR PREVENTING HAND GESTURE MISRECOGNITION AND ELECTRONIC DEVICE

CROSS-REFERENCE TO RELATED APPLICATIONS

This application is a National Stage of International Patent Application No. PCT/CN2021/129134, filed on Nov. 5, 2021, which claims priority to Chinese Patent Application No. 202011230632.9, filed on Nov. 6, 2020, both of which are hereby incorporated by reference in their entireties.

TECHNICAL FIELD

This application relates to the field of terminals, and in particular, to a method for preventing hand gesture misrecognition and an electronic device.

BACKGROUND

With development of computers, human-computer interaction has become an important part of people's daily life. As a contactless human-computer interaction manner, hand gesture recognition brings new experience to people.

Hand gesture recognition is a technology of recognizing human hand gestures based on an algorithm. A user may control or interact with a device by using simple hand gestures, to enable a computer to understand human behavior. Currently, in a hand gesture recognition technology, joint points of a hand of a user are recognized through a neural network, and then are matched with preset target hand gesture joint point templates. If similarities between the joint points of the hand of the user and joint points of a target hand gesture are greater than a threshold, an electronic device executes an instruction corresponding to the target hand gesture. For example, in a video playing process, the user may control a progress of video playback or pause the playback by using a hand gesture such as holding a first or waving a hand.

However, in an exercising process of the user, the user may perform some motions such as raising a hand and holding a fist. The motions are easily recognized by the electronic device as target hand gestures, resulting in hand gesture misrecognition.

SUMMARY

This application provides a method for preventing hand gesture misrecognition and an electronic device. Implementation of the method can reduce mistriggering of hand gesture recognition, and improve hand gesture recognition accuracy.

According to a first aspect, an embodiment of this application provides a method for preventing hand gesture misrecognition. The method includes: An electronic device obtains a plurality of image sequences including an object user. One image sequence in the plurality of image sequences is for determining a motion clip of the object user, and the image sequence includes one or more frames of images.

The electronic device determines a state of a hand gesture recognition function as a disabled state when determining, based on K1 motion clips of the object user, that the object user is exercising. The K1 motion clips are determined based on K1 image sequences, and K1 is a positive integer.

There are two cases in which the electronic device determines a state of a hand gesture recognition function as a disabled state. The first case is that, before the electronic device determines that the object user is exercising, the state of the hand gesture recognition function on the electronic device is the disabled state, and when the electronic device determines that the object user is exercising, the electronic device determines the state of the hand gesture recognition function as the disabled state. The other case is that before the electronic device determines that the object user is exercising, the state of the hand gesture recognition function on the electronic device is an enabled state, and when the electronic device determines that the object user is exercising, the electronic device switches the state of the hand gesture recognition function to the disabled state.

During implementation of the method provided in the first aspect, the electronic device disables the hand gesture recognition function when collecting images of an object user and determining that the object user is exercising, to prevent some motions of the user during exercising from easily causing hand gesture misrecognition, thereby improving user experience. With reference to some embodiments of the first aspect, in some embodiments, the method further includes: The electronic device determines the state of the hand gesture recognition function as an enabled state when determining, based on K2 sequential motion clips of the object user, that the object user stops exercising. The K2 sequential motion clips are determined based on K2 image sequences, and the K2 image sequences are collected after the K1 image sequences.

When determining that the object user stops exercising, the electronic device determines the state of the hand gesture recognition function as the enabled state.

After disabling the hand gesture recognition function, the electronic device continues a motion of the object user, and enables the hand gesture recognition function when determining, by recognizing the motion of the object user, that the object user is not exercising, to help the user to interact with or control the electronic device through a hand gesture, thereby improving user experience.

With reference to some embodiments of the first aspect, in some embodiments, the electronic device determines the state of the hand gesture recognition function as an enabled state when the electronic device detects that playback of a fitness course ends.

With reference to some embodiments of the first aspect, in some embodiments, the determining, based on K1 sequential motion clips of the object user, that the object user is exercising includes: The electronic device obtains K1 target sequential motion clips. The K1 target sequential motion clips are motion clips played by the electronic device when the K1 image sequences are collected.

The electronic device determines that the object user is exercising when similarities between the K1 sequential motion clips and the K1 target sequential motion clips are greater than a preset value.

The K1 sequential motion clips are not limited to only motion clips played by the electronic device at a moment when the K1 images are collected, and may also refer to motion clips played by the electronic device within a preset time before and after the electronic device collects the K1 image sequences.

With reference to some embodiments of the first aspect, in some embodiments, the determining, based on K1 sequential motion clips of the object user, that the object user is exercising includes: The electronic device determines, when a similarity between a first sequential motion clip and a first target sequential motion clip is greater than the preset value, that the object user is exercising. The first sequential motion clip is one of the K1 sequential motion clips, the first target sequential motion clip is a target sequential motion clip carrying a starting motion identifier, and the starting motion identifier indicates that the sequential motion clip is a starting part of a motion.

With reference to some embodiments of the first aspect, in some embodiments, the determining, based on K2 sequential motion clips of the object user, that the object user stops exercising includes: determining, when similarities between the K2 sequential motion clips and a second target sequential motion clip are less than the preset value, that the object user stops exercising. The second target sequential motion clip is a sequential motion clip displayed on the display of the electronic device.

With reference to some embodiments of the first aspect, in some embodiments, the determining, based on K2 sequential motion clips of the object user, that the object user stops exercising includes:

determining, when similarities between the K2 sequential motion clips and a third target sequential motion clip are greater than the preset value, that the object user stops exercising, where the third target sequential motion clip is a target sequential motion clip carrying an end identifier, and the end identifier indicates that the sequential motion clip is an end part of a motion.

According to a second aspect, an embodiment of this application provides a method for hand gesture misrecognition. The method includes: An electronic device obtains graphic information including an object user. The electronic device obtains a human body plane of the object user based on the graphic information. The electronic device calculates a deflection angle between the human body plane and a reference plane. The reference plane is a plane on which the electronic device is located. The electronic device determines, based on the deflection angle, a trigger threshold for hand gesture recognition as a trigger threshold. A larger deflection angle indicates a greater trigger threshold.

The graphic information includes depth information of the object user and a first image of the object user. That the electronic device obtains a human body plane of the object user based on the graphic information includes: The electronic device obtains 2D skeleton key points of the object user based on the first image. The electronic device obtains 3D skeleton points of the object user based on the 2D skeleton key points and the depth information of the object user. The electronic device obtains the human body plane of the object user through fitting based on the 3D skeleton points of the object user.

Alternatively, the graphic information includes a second image, and the second image is a depth map. The electronic device obtains 3D skeleton key points of the object user based on the second image. The electronic device obtains the human body plane of the object user through fitting based on the 3D skeleton key points of the object user.

During implementation of the method provided in the second aspect, the electronic device adaptively adjusts a trigger threshold for hand gesture recognition by calculating a deflection angle between the plane on which the electronic device is located and the human body plane of the object user.

With reference to some embodiments of the second aspect, in some embodiments, the deflection angle between the human body plane and the reference plane is a deflection angle between a first normal vector and a second normal vector, the first normal vector is a direction of a human body orientation in the human body plane, a direction of the second normal vector is a direction opposite to an orientation of the electronic device, and the orientation of the electronic device is a direction toward which the display of the electronic device faces.

With reference to some embodiments of the second aspect, in some embodiments, the electronic device determines, when the deflection angle is greater than a threshold, a state of a hand gesture recognition function as a disabled state.

According to a third aspect, an embodiment of this application provides an electronic device. The electronic device includes one or more processors and one or more memories. The one or more memories are coupled to the one or more processors, the one or more memories are configured to store computer program code, the computer program code includes computer instructions, and when the one or more processors execute the computer instructions, the electronic device is enabled to perform the method described in the first aspect and any possible implementation of the first aspect.

According to a fourth aspect, an embodiment of this application provides a chip system. The chip system is used in an electronic device. The chip system includes one or more processors, and the processor is configured to invoke computer instructions, to enable the electronic device to perform the method described in the first aspect and any possible implementation of the first aspect.

According to a fifth aspect, an embodiment of this application provides a computer program product including instructions. When the computer program product is run on an electronic device, the electronic device is enabled to perform the method described in the first aspect and any possible implementation of the first aspect.

According to a sixth aspect, an embodiment of this application provides a computer-readable storage medium, including instructions. When the instructions are run on an electronic device, the electronic device is enabled to perform the method described in the first aspect and any possible implementation of the first aspect.

It may be understood that, the electronic device provided in the third aspect, the chip system provided in the fourth aspect, the computer program product provided in the fifth aspect, and the computer storage medium provided in the sixth aspect are all configured to perform the method provided in embodiments of this application. Therefore, for beneficial effects that can be achieved by the electronic device provided in the third aspect, the chip system provided in the fourth aspect, the computer program product provided in the fifth aspect, and the computer storage medium provided in the sixth aspect, refer to beneficial effects in the corresponding method. Details are not described herein again.

BRIEF DESCRIPTION OF DRAWINGS

FIG. 18 is a flowchart of another method for preventing hand gesture misrecognition according to an embodiment of this application.

DESCRIPTION OF EMBODIMENTS

The technical solutions according to embodiments of this application are clearly and completely described below with reference to the accompanying drawings. In the descriptions of embodiments of this application, unless otherwise specified, "I" indicates "or". For example, AB may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

A term "user interface (user interface, UI)" in the following embodiments of this application is a medium interface for interaction and information exchange between an application or an operating system and a user, and implements conversion between an internal form of information and a form that can be accepted by the user. The user interface is source code written in a specific computer language such as Java or an extensible markup language (extensible markup language, XML). The interface source code is parsed and rendered on an electronic device, and finally presented as content that can be recognized by the user. The user interface is usually represented in a form of a graphical user interface (graphical user interface, GUI), and is a user interface that is related to a computer operation and that is displayed in a graphic manner. The user interface may be a visual interface element such as a text, an icon, a button, a menu, a tab, a text box, a dialog box, a state bar, a navigation bar, or a Widget that is displayed on a display of the electronic device.

Figure 1A:
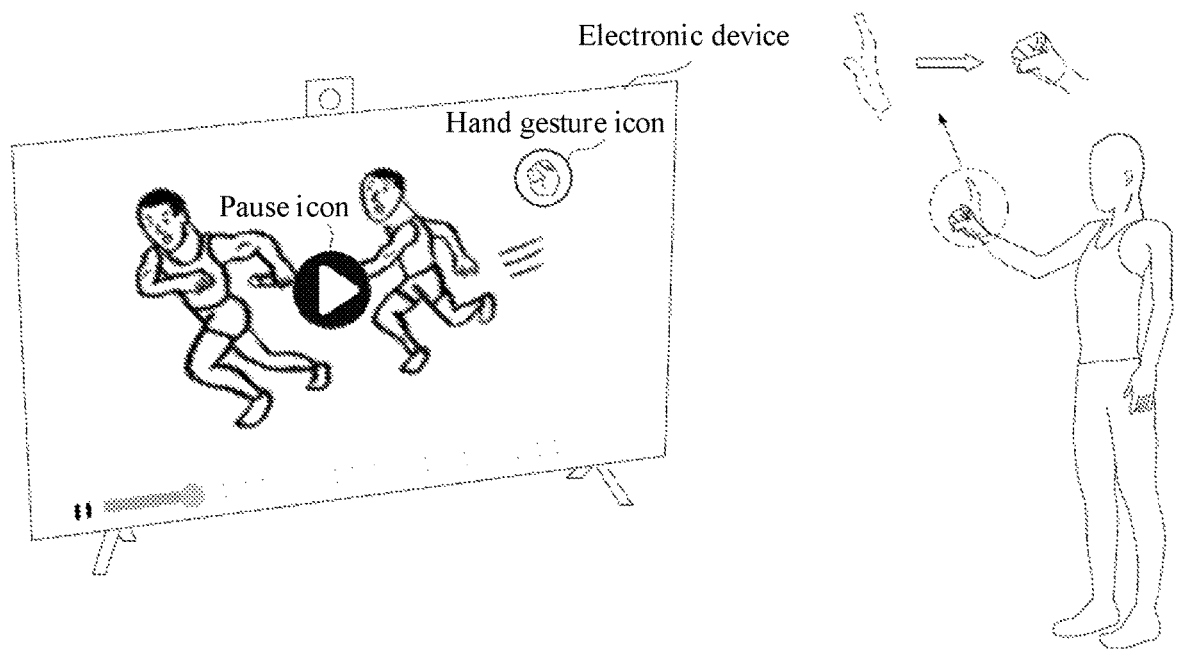
FIG. 1A is a schematic diagram of hand gesture recognition in the conventional technology.

Currently, hand gesture recognition is a way in which a user can control or interact with a device by using simple hand gestures, to enable a computer to understand human behavior. For example, as shown in FIG. 1A, when a user uses an electronic device to play a video, if the user needs to pause the video, the user only needs to make a fist-holding hand gesture in front of the electronic device. When the electronic device recognizes that the fist-holding hand gesture of the user is a target hand gesture, the electronic device displays an icon of the fist-holding hand gesture, and executes an instruction corresponding to the fist-holding hand gesture, that is, pauses the video that is being played, and displays a pause icon.

Figure 1B:
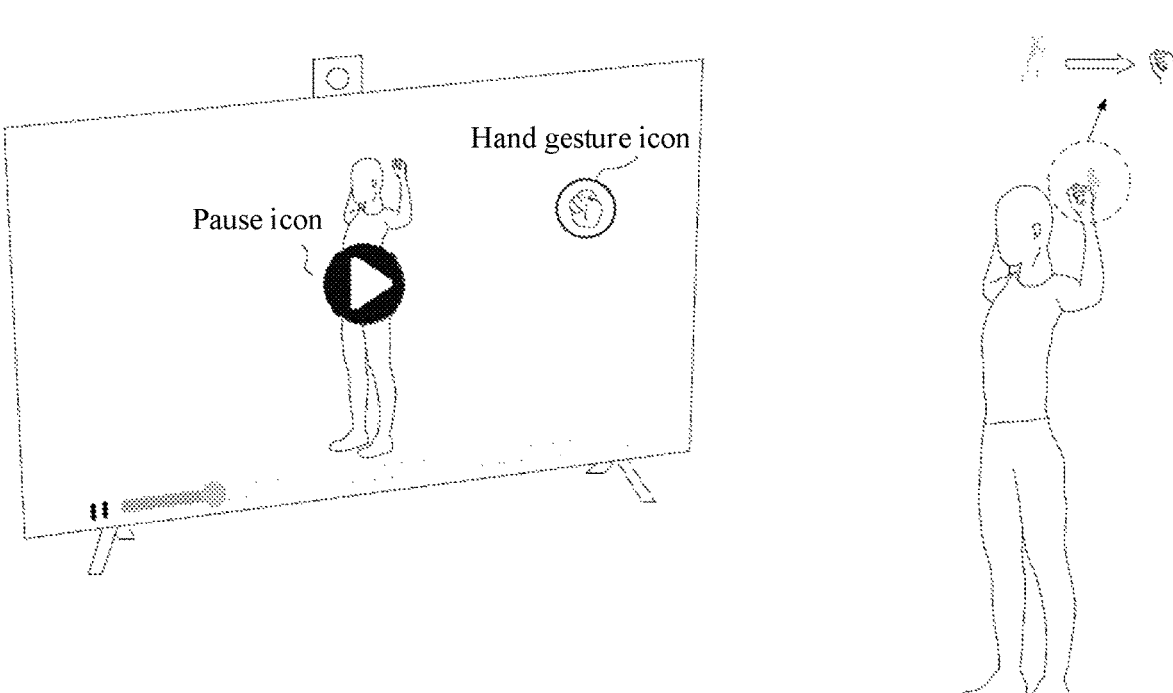
FIG. 1B is a diagram of an application scenario according to an embodiment of this application.

However, during some smart fitness or somatic games, the user may perform some motions such as raising a hand and holding a fist. The motions are easily recognized by the electronic device as target hand gestures, resulting in hand gesture misrecognition. For example, as shown in FIG. 1B, when a user is using an electronic device to perform fitness, if the user is making a motion of raising a hand and holding a fist, and the electronic device obtains the motion of holding a fist, matches the motion with target hand gesture templates in a template library, and obtains that an instruction corresponding to the hand gesture is a pause instruction, the electronic device pauses the motion video, and displays a pause icon of a pause hand gesture on a display. However, the intention of the user is not to pause the course. This may easily cause hand gesture misrecognition, consequently resulting in poor user experience.

To reduce hand gesture misrecognition, embodiments of this application provide a method for preventing hand gesture misrecognition. In this method, motion data of a user is obtained in real time, to recognize whether the user is exercising, to choose whether to disable a hand gesture recognition function. In addition, in this method, a trigger threshold for hand gesture recognition may be adaptively adjusted based on a deflection angle between a human body plane of the user and a plane on which the electronic device is located. When the deflection angle is small, it indicates that the user faces toward the electronic device. In this case, the trigger threshold for hand gesture recognition may be set to be low, and normal hand gesture recognition is performed. When the deflection angle is large, it indicates the user faces away from the electronic device, leading to a low probability of using the hand gesture recognition function. In this case, the trigger threshold for hand gesture recognition may be set to high.

By implementing the foregoing method, the electronic device may first determine whether the user is exercising, if the object user is exercising, the electronic device does not perform hand gesture recognition, and if the object user is not exercising, the electronic device performs hand gesture recognition. In this way, hand gesture misrecognition caused by the user during exercise can be effectively prevented. In addition, the electronic device may change a trigger threshold for hand gesture recognition based on an angle at which the user faces the electronic device, to change a difficulty degree of triggering hand gesture recognition, to reduce hand gesture misrecognition and improve user experience.

The following describes an electronic device provided in embodiments of this application.

Figure 2A:
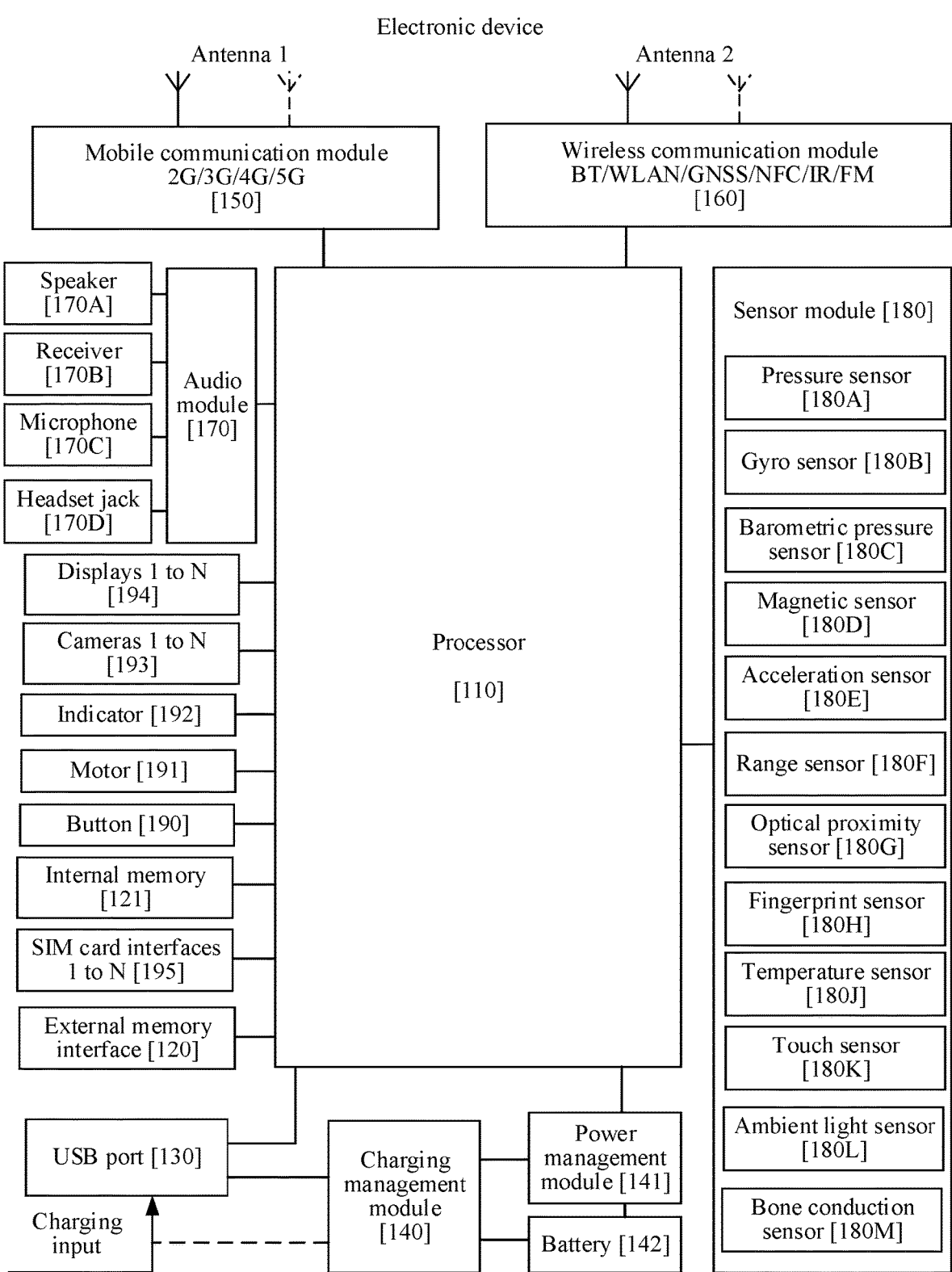
FIG. 2A is a schematic diagram of a hardware architecture according to an embodiment of this application.

FIG. 2A is a schematic diagram of a structure of the electronic device 100.

The electronic device 100 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device is not limited in embodiments of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache memory. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 via the CSI, to implement a photographing function of the electronic device 100. The processor 110 communicates with the display 194 via the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is an interface that conforms to a USB standard specification, and may be a mini USB port, a micro USB port, a USB Type C port, or the like. The USB port 130 may be configured to connect to a charger to charge the electronic device 100, or may be configured to transmit data between the electronic device 100 and a peripheral device, or may be configured to connect to a headset for playing audio through the headset. Alternatively, the interface may be configured to connect to another electronic device, for example, an AR device.

It may be understood that an interface connection relationship between the modules that is shown in this embodiment of the present disclosure is merely an example for description, and does not constitute a limitation on a structure of the electronic device 100. In other embodiments of this application, the electronic device 100 may alternatively use an interface connection mode different from that in the foregoing embodiment, or use a combination of a plurality of interface connection modes.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142, the charging management module 140, and the processor 110. The power management module 141 receives an input of the battery 142 and/or the charging management module 140, and supplies power to the processor 110, the internal memory 121, the display 194, the camera 193, the wireless communication module 160, and the like. The power supply management module 141 may be further configured to monitor parameters such as a battery capacity, a quantity of battery cycles, a battery state of health (leakage, impedance). In some other embodiments, the power management module 141 may also be disposed in the processor 110. In some embodiments, the power management module 141 and the charging management module 140 may also be disposed in a same device.

A wireless communication function of the electronic device 100 may be implemented by using the antenna 1, the antenna 2, the mobile communication module 150, the wireless communication module 160, the modem processor, and the like.

The antenna 1 and the antenna 2 are configured to transmit and receive an electromagnetic wave signal. Each antenna in the electronic device 100 may be configured to cover one or more communication frequency bands. Different antennas may be multiplexed to improve antenna utilization. For example, the antenna 1 may be multiplexed as a diversity antenna in a wireless local area network. In some other embodiments, the antennas may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules in the mobile communication module 150 may be disposed in a same component as at least some modules in the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low frequency baseband signal obtained through demodulation to the baseband processor for processing. After being processed by the baseband processor, the low frequency baseband signal is transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same component as the mobile communication module 150 or another functional module.

The wireless communication module 160 may provide a wireless communication solution that is applied to the electronic device 100, and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs demodulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD). The display panel may also be made of an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diode, QLED), or the like. In some embodiments, the electronic device may include one or N displays 194, where N is a positive integer greater than 1.

In this embodiment of this application, the display 194 may be configured to display a fitness course video or a fitness image of the user.

The electronic device 100 may implement a photographing function through the camera 193, the ISP, the video codec, the GPU, the display 194, the application processor and the like.

The ISP may be configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

In embodiments of this application, the camera 193 is configured to obtain a motion video or image of a user.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications, such as intelligent cognition, of the electronic device 100 may be implemented through the NPU, for example, image recognition, facial recognition, speech recognition, and text understanding.

The internal memory 121 may include one or more random access memories (random access memories, RAMs) and one or more nonvolatile memories (nonvolatile memories, NVMs).

The random access memory may include a static random access memory (static random-access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth-generation DDR SDRAM, which is generally referred to as a DDR5 SDRAM), and the like. The nonvolatile memory may include a magnetic disk storage device, a flash memory (flash memory), and the like.

The flash memory may be divided according to an operation principle, and may include a NOR flash memory, a NAND flash memory, a 3D NAND flash memory, and the like. The flash memory may be divided based on a potential level of a cell, and may include a single-level cell (single-level cell, SLC), a multi-level cell (multi-level cell, MLC), a triple-level cell (triple-level cell, TLC), a quad-level cell (quad-level cell, QLC), and the like. The flash memory may be divided based on a storage specification, and may include a universal flash memory (English: universal flash storage, UFS), an embedded multimedia card (embedded multimedia Card, eMMC), and the like.

The random access memory may be directly read and written by the processor 110. The random access memory may be configured to store an operating system or an executable program (for example, machine instructions) of another running program, and may be further configured to store data of a user and an application, and the like.

The nonvolatile memory may also store an executable program, store data of a user and an application, and the like, and may be loaded to the random access memory in advance, so that the processor 110 directly performs read and write.

The external memory interface 120 may be configured to connect to an external nonvolatile memory, to extend a storage capability of the electronic device 100. The external nonvolatile memory communicates with the processor 110 through the external memory interface 120, to implement a data storage function. For example, files, such as music and a video, are stored in an external nonvolatile memory.

The electronic device 100 may implement an audio function, such as music playing or recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or voice information is received through the electronic device 100, the receiver 170B may be put close to a human ear to listen to a voice.

The microphone 170C, also referred to as a "mike" or a "microphone", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and recognize a sound source, to implement a directional recording function and the like.

The headset jack 170D is configured to connect to a wired headset. The headset jack 170D may be the USB interface 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The acceleration sensor 180E may detect accelerations in various directions (usually on three axes) of the electronic device 100, and may detect a magnitude and a direction of gravity when the electronic device 100 is still. The acceleration sensor 180E may be further configured to recognize a posture of the electronic device, and is used in screen switching between a landscape mode and a portrait mode, a pedometer, or another application.

The range sensor 180F is configured to measure a distance. The electronic device 100 may measure a distance in an infrared manner or a laser manner. In some embodiments, in a photographing scenario, the electronic device 100 may measure a distance through the range sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically perform screen-off for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The touch sensor 180K is also referred to as a "touch component". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194. In some other embodiments, the touch sensor 180K may alternatively be disposed on a surface of the electronic device 100 at a position different from that of the display 194.

The button 190 includes a power button, a volume button, and the like. The button 190 may be a mechanical button, or may be a touch button. The electronic device 100 may receive a key input, and generate a key signal input related to a user setting and function control of the electronic device 100.

The indicator 192 may be an indicator light, and may be configured to indicate a charging state and a power change, or may be configured to indicate a message, a missed call, a notification, and the like.

The electronic device may be a portable terminal device carrying iOS, Android, Microsoft, or another operating system, for example, a mobile phone, a tablet computer, or a wearable device. Alternatively, the electronic device may be a non-portable terminal device such as a laptop (Laptop) having a touch-sensitive surface or a touch panel, or a desktop computer having a touch-sensitive surface or a touch panel. A software system of the electronic device 100 may have a layered architecture, an event-driven architecture, a microkernel architecture, a micro service architecture, or a cloud architecture. In embodiments of the present disclosure, an Android system of a layered architecture is used as an example to describe a software structure of the electronic device 100.

Figure 2B:
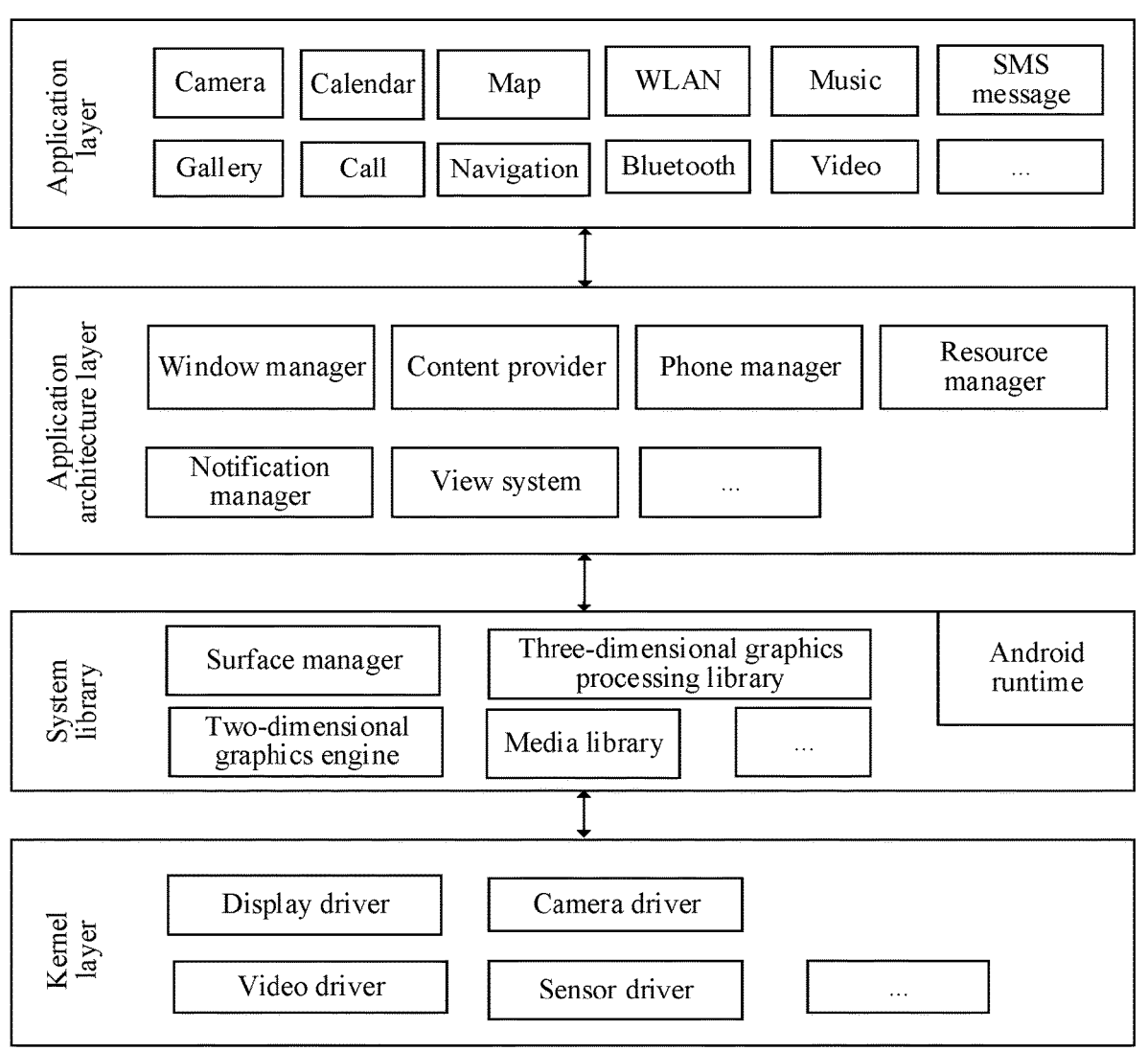
FIG. 2B is a schematic diagram of a software architecture according to an embodiment of this application.

FIG. 2B is a block diagram of a software structure of the electronic device 100 according to an embodiment of the present disclosure.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2B, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

A window manager is configured to manage a window program. The window manager may obtain a size of a display, determine whether there is a state bar, perform screen locking, take a screenshot, and the like.

The content provider is configured to store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying a picture. The view system may be used to construct an application. A display interface may include one or more views. For example, a display interface including an SMS message notification icon may include a text display view and a picture display view.

The phone manager is configured to provide a communication function for the electronic device 100, for example, management of a call state (including answering, declining, or the like).

The resource manager provides various resources such as a localized character string, an icon, an image, a layout file, and a video file for an application.

The notification manager enables an application to display notification information in a state bar, and may be configured to convey a notification message. The notification manager may automatically disappear after a short pause without requiring a user interaction. For example, the notification manager is configured to notify download completion, provide a message notification, and the like. The notification manager may alternatively be a notification that appears in a top state bar of the system in a form of a graph or a scroll bar text, for example, a notification of an application running on the background or a notification that appears on a screen in a form of a dialog window. For example, text information is prompted in the state bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and abnormality management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem, and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Embodiments of this application provide a method for preventing hand gesture misrecognition. In the method, motion data of a user is obtained in real time, a motion of the user is recognized based on the motion data of the user, and the motion of the user is matched with motions in a template library. When a similarity between the motion of the user and a motion in the template library is greater than a preset value, it is determined that the user is exercising, and in this case, hand gesture recognition is disabled.

For ease of understanding, the following first describes a template library in embodiments of this application.

In embodiments of this application, a fitness application is installed on the electronic device 100, and the fitness application may be for providing fitness guidance for a user. The fitness application includes a plurality of fitness courses, and the user may select any one of the plurality of fitness courses for fitness guidance. To facilitate comparison between a motion of the user and a motion of a coach, the electronic device 100 saves the motion of the coach in each fitness course as a motion template. Therefore, a plurality of motion templates may be obtained from a plurality of fitness courses, and the motion templates are referred to as a template library.

Figure 3:
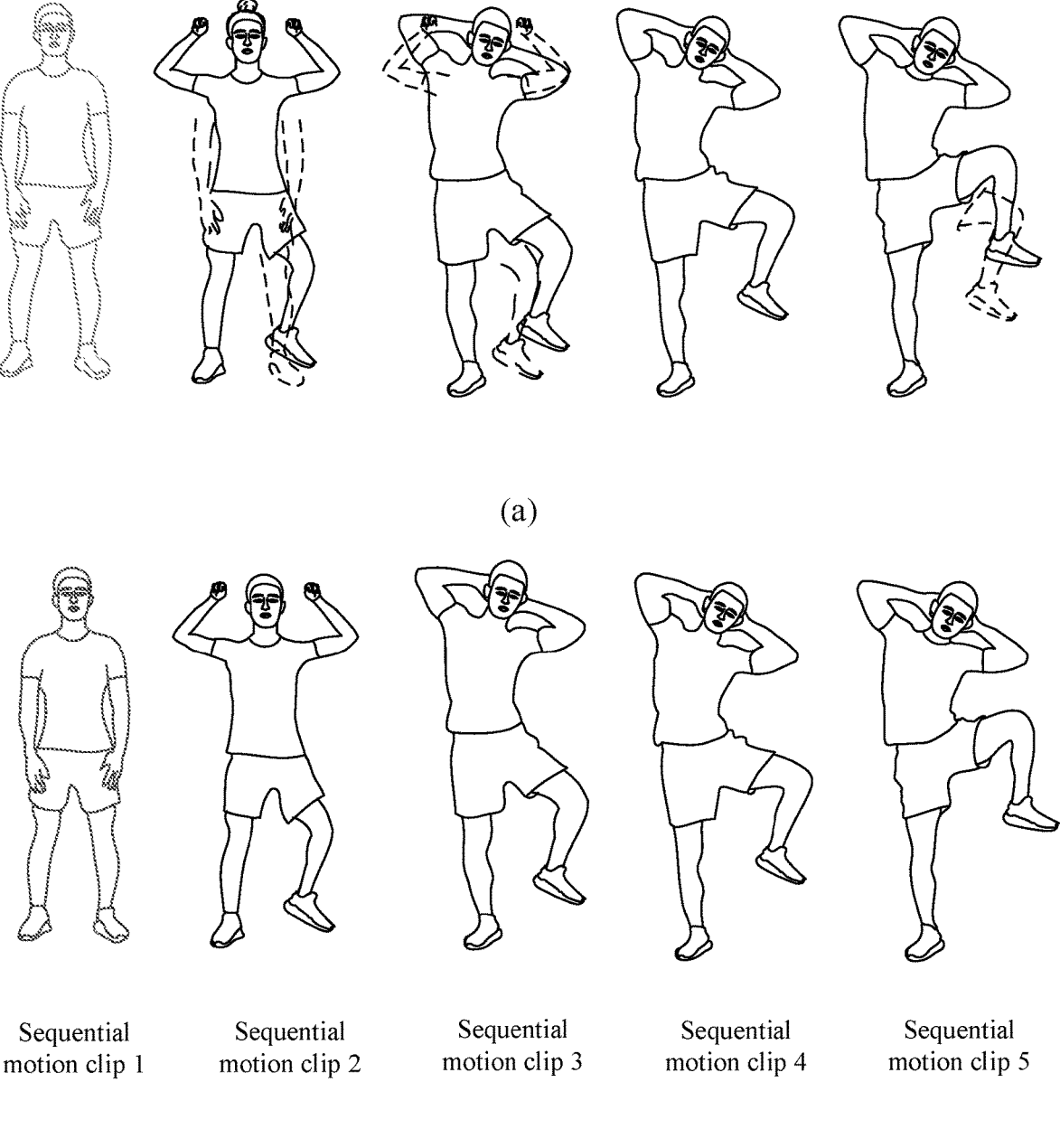
FIG. 3 is a schematic diagram of sequential motion template division according to an embodiment of this application.

Generally, a motion of a coach in a fitness course is a continuous motion in a time period. The electronic device 100 first needs to divide, based on a sequential motion division algorithm, a continuous motion in a fitness course into a series of sequential motion clips based on a fitness course video, and prestores the series of sequential motion clips as a sequential motion template of the fitness course. FIG. 3 shows an example in which a motion of a coach is divided into a series of sequential motions. As shown in (a) in FIG. 3, a motion of a coach in a course is holding the head and lifting a leg. The electronic device 100 uses a sequential motion division algorithm to divide the motion into a plurality of sequential motion clips. For example, as shown in (b) in FIG. 3, the motion may be divided into a sequential motion clip 1 to a sequential motion clip 5. Notably, in this application, completing the sequential motion clip 1 to the sequential motion clip 5 is referred to as completing a complete motion. A complete motion includes a starting motion clip, a process motion clip, and an end motion clip. Further, the electronic device 100 may further mark sequential motions of the motion of the coach. For example, the sequential motion clip 1 and the sequential motion clip 2 may be marked as a starting motion, that is, a starting part of a complete motion. In another example, the sequential motion clip 4 and the sequential motion clip 5 may be marked as an end motion, that is, an end part of a complete motion. In embodiments of this application, the sequential motion clip 1 and the sequential motion clip 2 may be referred to as a first target sequential motion clip. The sequential motion clip 4 and the sequential motion clip 5 may be referred to as a third sequential motion clip.

It may be understood that the template library includes motions in all fitness courses in the fitness application, and motion templates in the template library may be updated in real time. For example, if a fitness course is newly added to the fitness application, a motion template in the fitness course is correspondingly added to the template library.

The following describes a scenario of determining whether a user is exercising provided in embodiments f this application.

Figure 4A:
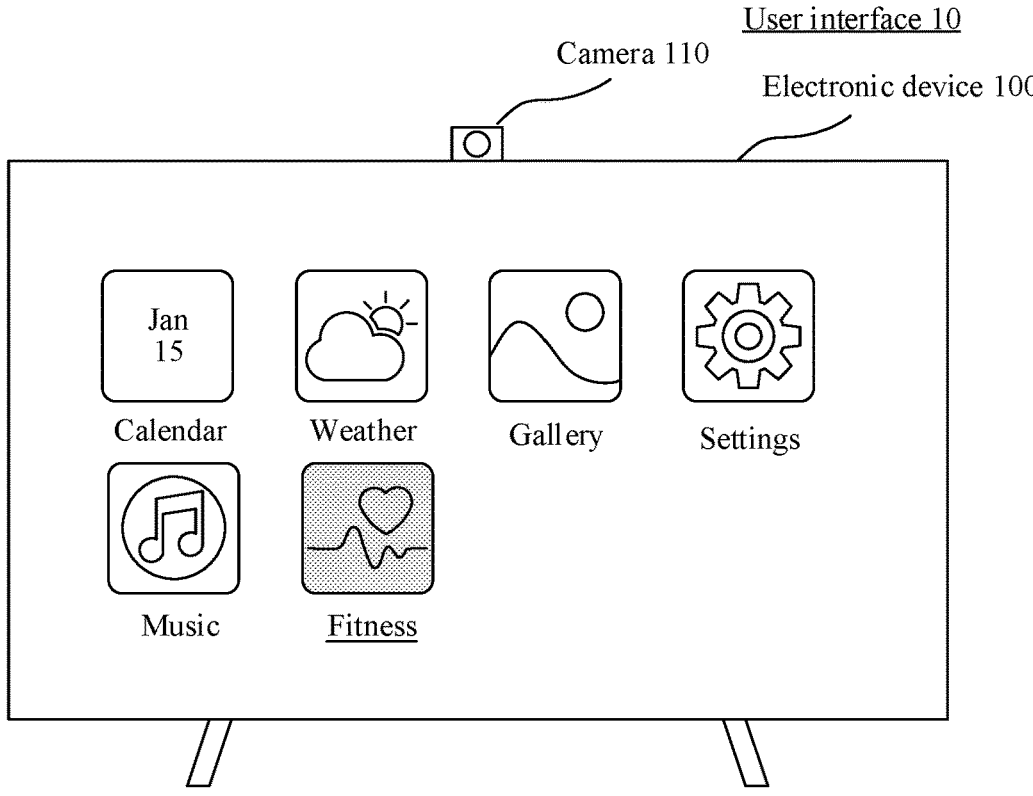
FIG. 4A to FIG. 4C are schematic diagrams of interfaces according to an embodiment of this application.
Figure 4B:
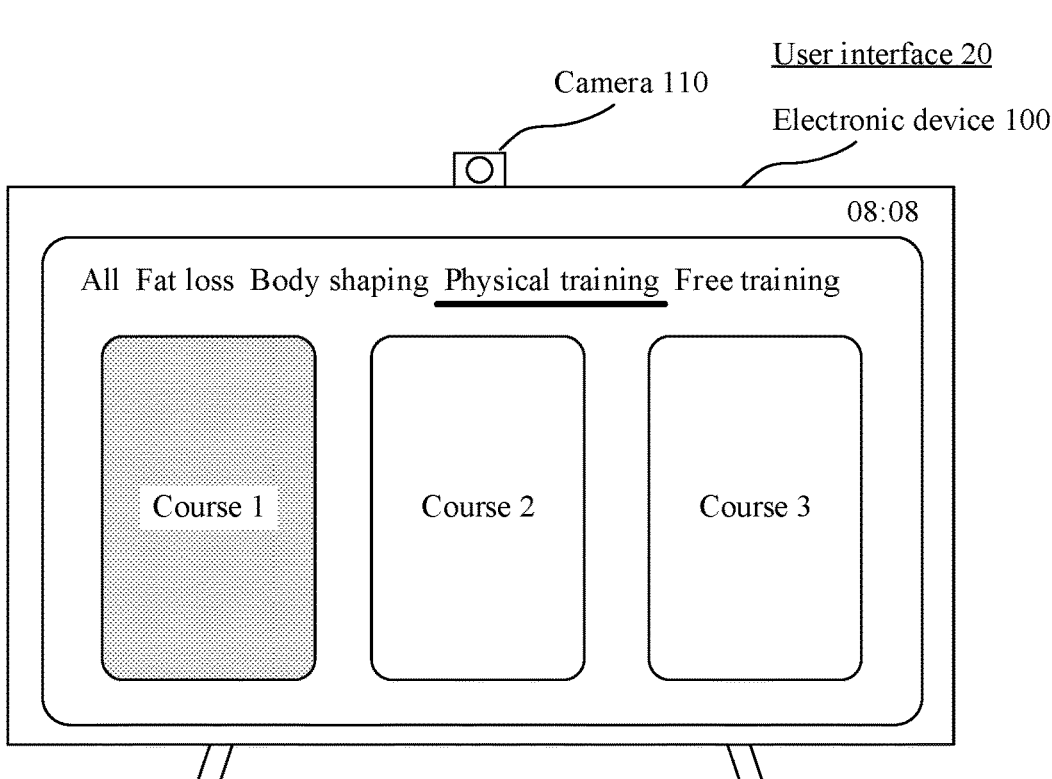

FIG. 4A shows an example of a user interface 10 of an application on the electronic device 100. Referring to FIG. 4A, a fitness application is installed on the electronic device 100. When a user wants to use the electronic device 100 to perform fitness, the user may open the fitness application for fitness guidance. As shown in FIG. 4B, the user may enter an operation of opening a fitness application. In response to the operation of opening the fitness application performed by the user, the electronic device 100 displays a user interface 20. The user interface 20 includes a plurality of fitness courses. The user may select a corresponding fitness course based on a demand of the user. For example, as shown in FIG. 4B, after the user selects a course 1, the electronic device 100 obtains a motion template corresponding to the course 1 in the template library.

Before the user selects a corresponding fitness course, the electronic device 100 needs to determine an object user. The object user is a user who uses the electronic device 100 for fitness guidance.

In some embodiments, the electronic device 100 may determine the object user by recognizing a motion of the user.

As an example, the electronic device 100 may display a target motion or display prompt information, for example, nodding, having arms akimbo, or swinging an arm, to prompt the user to complete the target motion. The electronic device 100 may obtain motion data of the user through the camera 110, and match a motion of the user with the target motion. If the matching succeeds, the electronic device 100 determines that the user is the object user. The camera 110 may be a camera 193 on the electronic device 100, or may be a camera that establishes a connection to the electronic device 100 in a wired or wireless connection manner, for example, a home smart camera. The camera 110 may collect a real-time image, and send the image to the electronic device 100. When the camera 110 establishes a connection to the electronic device 100 in a wired or wireless connection manner, or the like, the camera 110 may send the collected real-time image to the electronic device 100 through a wired or wireless network. The wired connection is, for example, that the electronic device 100 is connected to the camera 110 through a data cable. For example, the wireless connection is a high-fidelity wireless communication (Wi-Fi) connection, a Bluetooth connection, an infrared connection, an NFC connection, or a ZigBee connection. This is not limited in embodiments of this application.

Figure 4C:
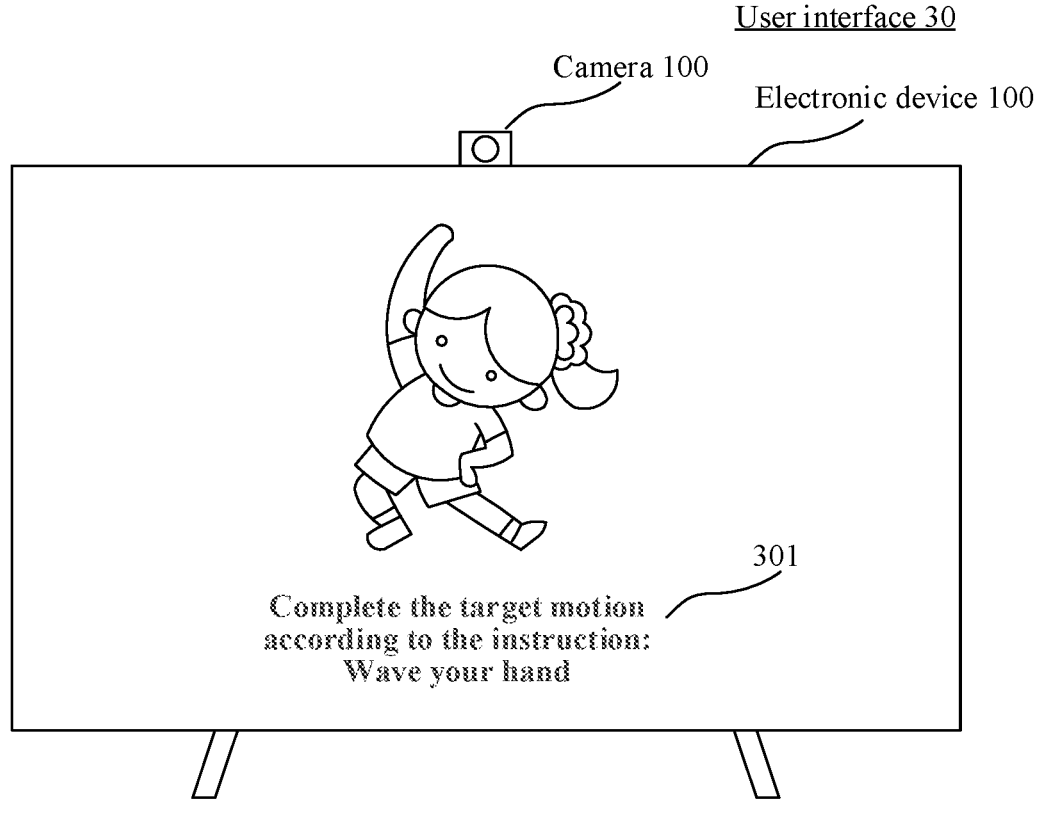

For example, FIG. 4C shows an example of a user interface 330 for displaying a prompt motion by an electronic device 100. As shown in FIG. 4C, a target motion 311 and a prompt box 312 are displayed on a display of the electronic device 100. The prompt box 312 may include "Complete the target motion according to the instruction: hold a fist", to prompt a user to complete the target motion based on information in the prompt box and a target motion template. The electronic device 100 may start the camera 110 to collect motion data of the user, and recognize a motion of the user. The motion of the user is matched with the target motion. If the matching succeeds, the electronic device 100 determines that the user is an object user.

Notably, the electronic device 100 may also determine the object user after the user selects a corresponding fitness course. For example, the electronic device 100 first starts the camera 110 to collect motion data of the user, and determines the user as the object user, and then, the user selects a fitness course. This is not limited in this application.

In some optional embodiments, the electronic device 100 may further collect facial features of the user through the camera 110, to obtain facial information of the user, and compare the facial information of the user with prestored facial information. If a matching degree between the facial information of the user and the prestored facial information exceeds a specific threshold, the electronic device 100 determines the user as the object user.

In some optional embodiments, the electronic device 100 may further determine the object user by combining user motion recognition and facial recognition. As an example, the electronic device 100 first obtains facial information of the user, and matches the facial information of the user with prestored facial information. If the matching succeeds, the electronic device 100 determines that the user is the object user. If the matching fails, the electronic device 100 obtains motion data of the user, recognizes a motion of the user, and matches the motion of the user with the target motion. If the matching succeeds, the electronic device 100 determines that the user is the object user.

In some optional embodiments, the electronic device 100 may further obtain a human body posture of the user through a wearable device when determining the object user. For example, a motion sensor in the wearable device may collect motion data of the user, for example, acceleration. A wireless communication connection is established between the electronic device 100 and the wearable device, to implement data communication between them. Alternatively, the electronic device 100 and the wearable device may establish a remote connection by logging in to a same account. For example, the electronic device 100 and the wearable device may log in to a same Huawei account, and be connected by a Huawei server. The wearable device may send the motion data of the user to the electronic device 100. The electronic device 100 may predict a motion of the user based on the motion data of the user sent by the wearable device, match the motion of the user with the target motion, and if the matching succeeds, determine that the user is the object user.

In some optional embodiments, a case in which an image obtained by the electronic device 100 does not include the user indicates that the user is not in a shooting range of the camera. The electronic device 100 may display prompt information, to prompt the user to change a location, to ensure that the camera can detect the user.

The foregoing examples in which the electronic device 100 determines an object user are merely examples, and should not constitute a limitation on this application. In actual implementation, the electronic device 100 may alternatively determine the object user in another manner. This is not limited in this application.

After the object user selects a fitness course, the electronic device 100 enables a fitness mode, that is, the electronic device 100 plays a fitness course in a fitness application, and the electronic device 100 keeps the camera 110 on, to continuously collect motion data of the object user.

Figure 5:
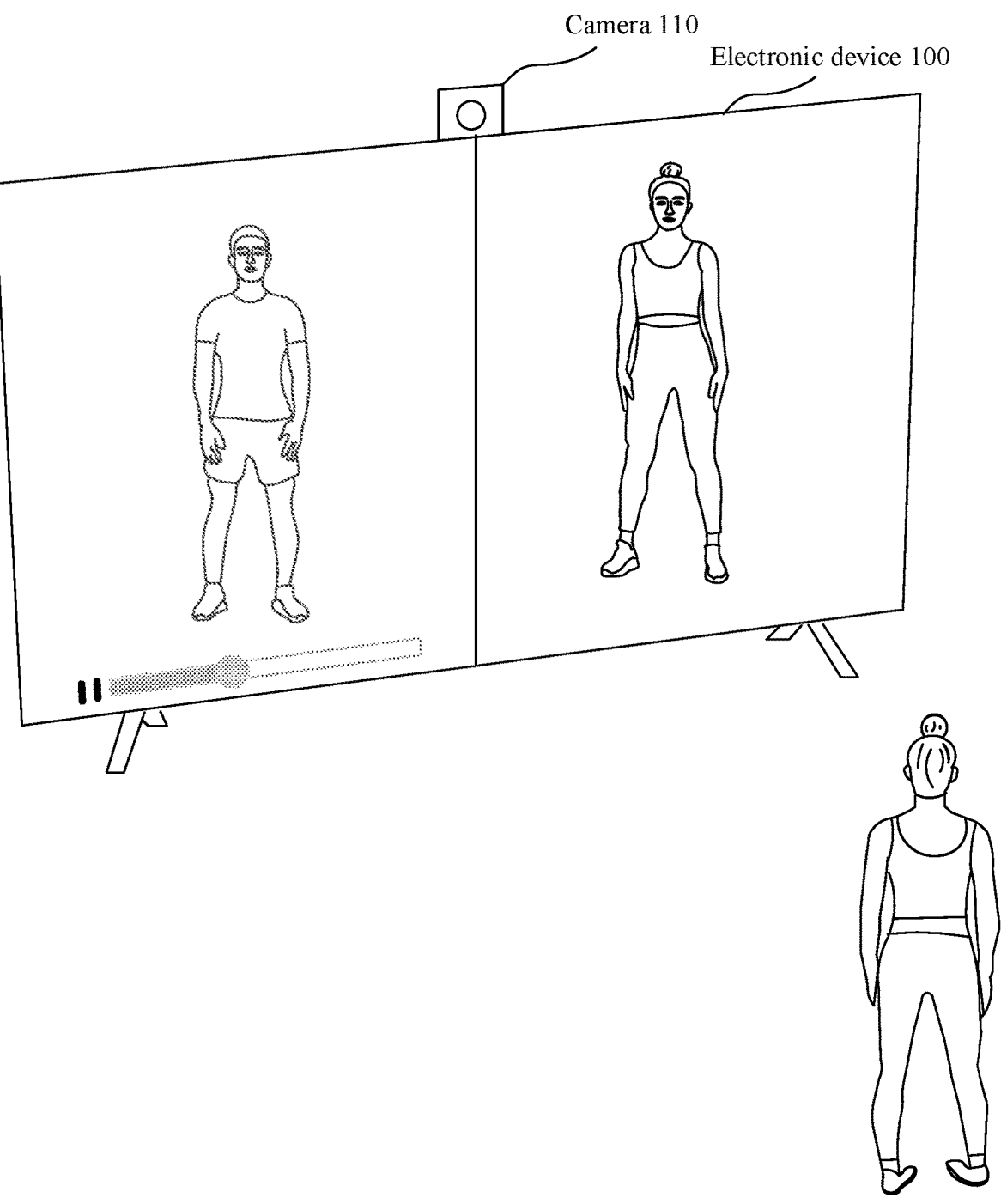
FIG. 5 shows obtaining an object user according to an embodiment of this application.

For example, as shown in FIG. 5, the electronic device 100 is playing a fitness course, and a motion of a coach in the course may correspond to a sequential motion clip in a template library. That is, the electronic device 100 prestores, in the template library, a sequential motion template corresponding to the course. For example, a sequential motion clip shown in FIG. 3 is used. The camera 110 obtains an image including a series of motion data of the object user.

The electronic device 100 may recognize a motion of the object user based on the image, and match the motion of the user with a motion template in the template library. When the motion of the object user successfully matches the motion template in the template library, the electronic device 100 determines that the object user is exercising. That the matching succeeds means that a similarity between the motion of the object user and a sequential motion clip carrying a starting identifier in the template library is greater than a preset value.

For example, as shown in FIG. 5, a motion D1 of an object user may be recognized based on an image, and the motion D1 is matched with a motion in a template library. If it can be learned from FIG. 3 that a similarity between the motion D1 and a sequential motion clip 1 in the template library is greater than a preset value, and the sequential motion clip 1 is a sequential motion clip carrying a starting motion identifier, the electronic device 100 determines that the object user is exercising.

In some embodiments, that the matching succeeds means that similarities between motions of the object user and a preset quantity of sequential motion clips in the template library are greater than a preset value.

For example, the electronic device 100 recognizes, based on the image, a plurality of motions of the object user, for example, a motion 1, a motion 2, and a motion 3. If similarities between the motion 1, the motion 2, and the motion 3 and a sequential motion clip 1, a sequential motion clip 2, and a sequential motion clip 3 in the template library are greater than a preset value, it is determined that the object user is exercising.

In embodiments of this application, hand gesture recognition is disabled when the electronic device 100 determines that the object user is exercising. In this way, when the object user is exercising, the electronic device 100 disables hand gesture recognition for the user. Even if the object user performs some motions, such as raising a hand and holding a fist, that may easily cause hand gesture misrecognition during exercise, the electronic device 100 does not trigger a hand gesture recognition instruction. In this way, a problem that some motions of the user during exercise may easily cause hand gesture misrecognition can be avoided.

Figure 6:
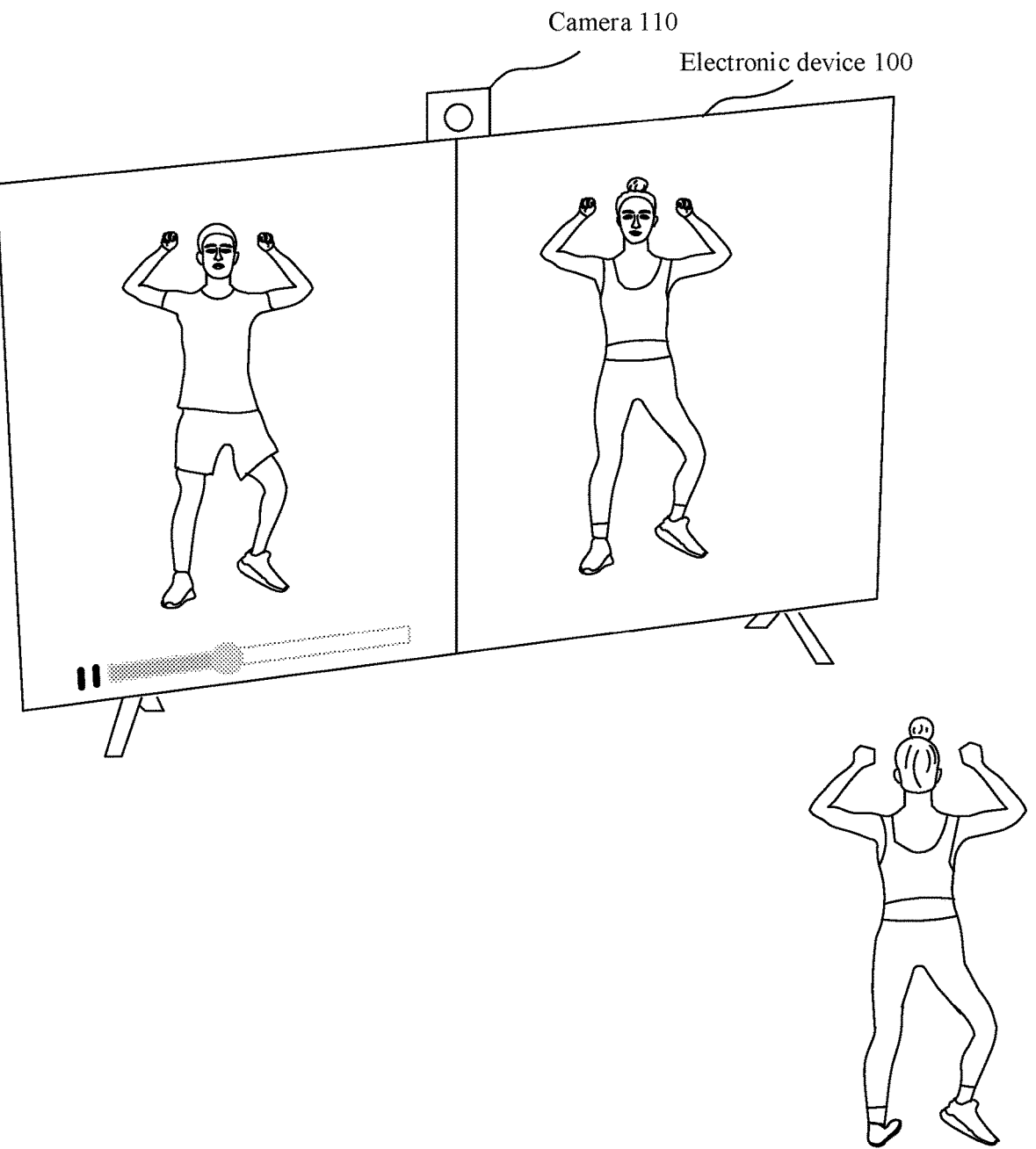
FIG. 6 is a schematic diagram of exercising of an object user when hand gesture recognition is disabled according to an embodiment of this application.

For example, FIG. 6 is a schematic diagram of exercising of an object user when hand gesture recognition is disabled according to an embodiment of this application. As shown in FIG. 6, the object user is raising a hand and holding a fist, and an instruction corresponding to the fist-holding hand gesture is pause. In this case, the electronic device 100 has disabled hand gesture recognition. Therefore, the electronic device 100 does not analyze the fist-holding hand gesture, and the electronic device 100 still plays a course video, does not pause the fitness course, and does not display a pause icon.

In embodiments of this application, after the electronic device 100 disables the hand gesture recognition function, the electronic device 100 further continuously obtains motion data of a motion of the object user, recognizes the motion of the object user, and matches the motion of the object user with motions of a coach. The electronic device 100 determines, based on the motion of the object user, whether the object user stops exercising.

Figure 7:
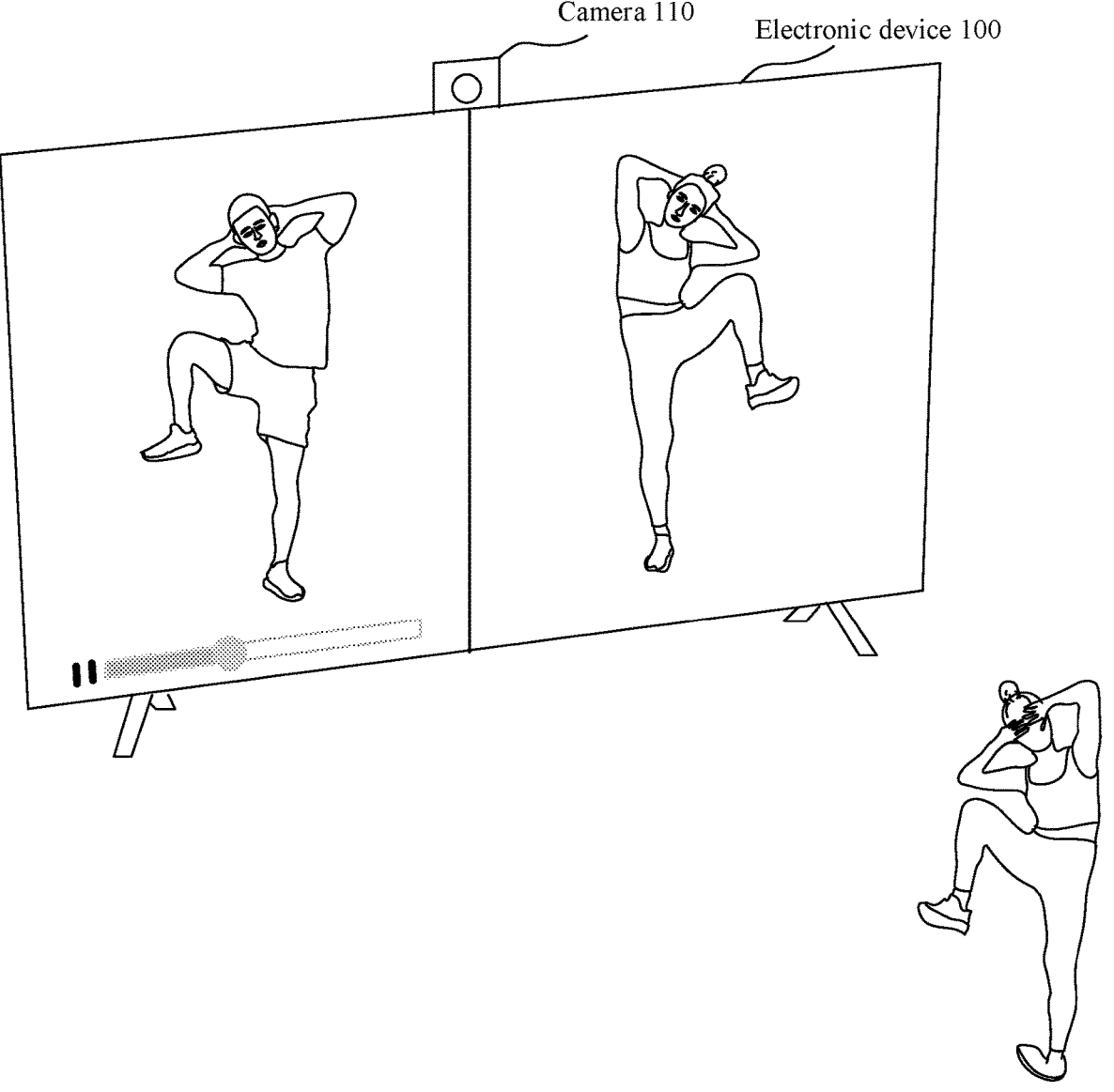
FIG. 7 is a schematic diagram of exercising of an object user according to an embodiment of this application.

As shown in FIG. 7, the object user is holding the head and lifting a leg, and the electronic device 100 obtains an image including the object user. The electronic device 100 may obtain a motion D2 of the object user based on the image, and match the motion D2 of the object user with a motion template in the template library. If it can be learned from FIG. 3 that the motion D2 of the object user success-fully matches a sequential motion clip 5 in the template library, and the electronic device 100 determines that the object user stops exercising.

In embodiments of this application, after the object user stops exercising, the electronic device 100 enables the hand gesture recognition function, that is, the electronic device 100 obtains a hand gesture of the user in real time. If the hand gesture of the user successfully matches a target hand gesture, the electronic device 100 executes an instruction corresponding to the hand gesture.

Figure 8:
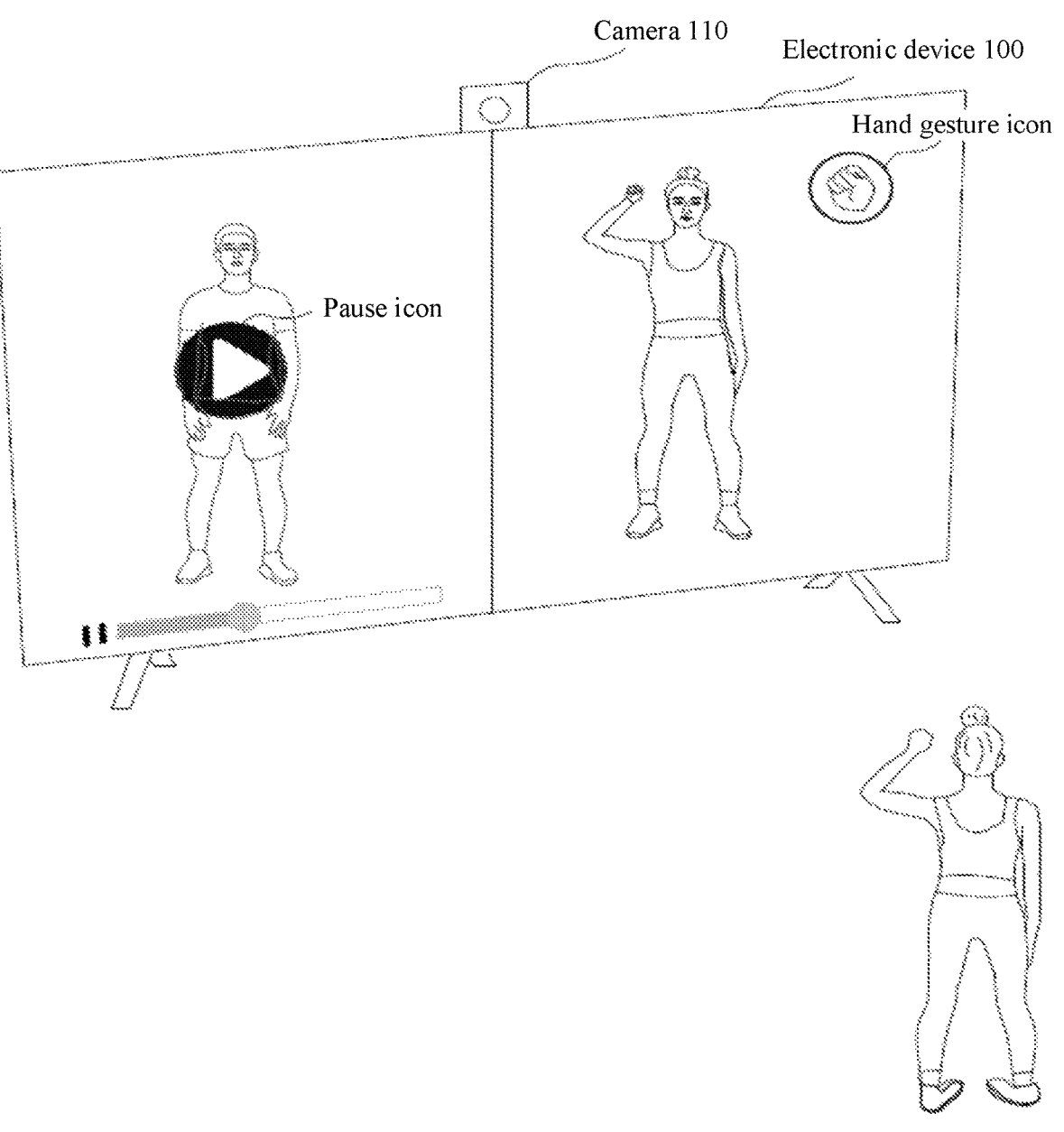
FIG. 8 is a schematic diagram when hand gesture recognition is enabled according to an embodiment of this application.

For example, FIG. 8 is an example of a schematic diagram after the electronic device 100 starts hand gesture recogni-tion. As shown in FIG. 8, the object user has stopped exercising and needs to rest. The object user makes a fist-holding hand gesture corresponding to the electronic device 100. In this case, the electronic device 100 analyzes the hand gesture of the object user, and learns that an instruction corresponding to the fist-holding hand gesture is a pause instruction. The electronic device 100 pauses the fitness course, and displays a pause icon.

In some optional embodiments, when learning that the course played on the electronic device 100 ends, the elec-tronic device 100 also considers that the object user stops exercising, and the electronic device 100 enables a motion mode.

With reference to the foregoing user interfaces, a method for preventing hand gesture misrecognition provided in embodiments of this application is described below in embodiments of this application. FIG. 8 shows an example of a flowchart of a method for preventing hand gesture misrecognition according to an embodiment of this appli-cation.

S101. An electronic device 100 determines an object user.

The object user is a user who uses the electronic device 100 for fitness guidance. After the electronic device 100 determines the object user, the electronic device 100 tracks the object user, collects motion data of the object user, and analyzes the motion data of the object user, to provide fitness guidance for the object user.

For example, a fitness application is installed on the electronic device 100. When the user wants to perform fitness, the fitness application in the electronic device 100 may provide smart fitness guidance for the user. The elec-tronic device 100 needs to determine the object user before performing fitness guidance for the user. After determining the object user, the electronic device 100 collects an image of the object user through a camera, and recognizes a motion of the object user based on the image. Then, completion quality of the motion is evaluated based on key indicators of a fitness motion, and intelligent fitness guidance is provided for the user. For example, a motion error is indicated, and improvement suggestions are provided.

In some embodiments, the electronic device 100 may determine the object user by recognizing a motion posture of the user. For related descriptions of determining the object user by the electronic device 100 by recognizing the motion of the user, refer to the embodiment in FIG. 4C. Details are not described herein again.

In some optional embodiments, the electronic device 100 may further collect facial features of the user through the camera, match facial information of the user with prestored facial information, and if the matching succeeds, determine the user as the object user.

In some optional embodiments, the electronic device 100 may further determine the object user by combining human body posture recognition and facial recognition. As an example, if the matching performed by the electronic device 100 fails, the electronic device 100 performs recognition through a human body posture of the user, to determine the object user.

In some optional embodiments, the electronic device 100 may further obtain a human body posture of the user through a wearable device when determining the object user. For example, a motion sensor in the wearable device may collect motion data of the user, for example, acceleration. A wireless communication connection is established between the elec-tronic device 100 and the wearable device, to implement data communication between them. Alternatively, the elec-tronic device 100 and the wearable device may establish a remote connection by logging in to a same account. For example, the electronic device 100 and the wearable device may log in to a same Huawei account, and be connected by a Huawei server.

In some optional embodiments, a case in which an image obtained by the electronic device 100 does not include a human body posture indicates that the user is not in a shooting range of the camera. The electronic device 100 may display prompt information, to prompt the user to change a location, to ensure that the camera can detect the user.

It should be noted that in embodiments of this application, there may be one, two, or more object users. This is not limited in this application.

S102. The electronic device 100 receives an operation performed by the object user, and enables a fitness mode in response to the operation of the object user.

The operation performed by the object user is for playing a fitness course in a fitness application on the electronic device 100. The electronic device 100 enables the fitness mode in response to the operation performed by the object user. That the electronic device 100 enables a fitness mode is that the electronic device 100 plays a fitness course in a fitness application, and keeps the camera on, to continuously collect motion data of the object user.

As an example, the electronic device 100 may obtain, through a display, an operation entered by the user. For example, the display may be a touchscreen, and an operation entered by the user may be obtained through the touch-screen. Alternatively, the electronic device 100 may obtain, through a key, an operation entered by a user. Alternatively, the electronic device 100 may further obtain, through a sensor, an operation entered by the user, for example, obtain an operation entered by the user to the electronic device 100 through a remote control. A manner of enabling the fitness mode is not limited in this application.

For example, when the electronic device is a Huawei Vision, the user may choose to perform an operation on a fitness application through a remote control. The electronic device 100 is equipped with a remote control, and a user of the remote control controls the electronic device 100. The remote control may receive a key input, generate a key signal input related to a user setting and function control of the electronic device 100, and send corresponding control information to the electronic device, to control the electronic device 100. For example, the remote control may send a control signal to the electronic device 100 through overseas information or the like.

For example, a fitness application is installed on the electronic device 100. After receiving an operation per-formed by a user, the electronic device 100 plays a fitness course in the fitness application, and the user may perform fitness based on a motion in the fitness course.

It may be understood that an execution sequence of step S101 and step S102 may be changed, and an execution sequence of step S101 and step S102 is not limited in embodiments of this application.

S103. The electronic device 100 obtains an image sequence A including a motion of the object user.

The image sequence A is a set including a plurality of frames of images, and each frame of image in the image sequence A includes the object user.

The electronic device 100 may obtain one frame of image including the object user every time period, to obtain the image sequence A. Generally, a motion of the user is continuous. The electronic device 100 may photograph an image including the object user every 0.5 seconds until the object user completes the motion. The electronic device 100 may obtain a plurality of images including the object user. Alternatively, the electronic device 100 may obtain a motion video including the object user. The motion video includes a plurality of consecutive frames of images, and each frame of image includes the object user. The electronic device 100 may obtain one frame of image based on the video every preset quantity of frames, so that an image sequence A may be obtained. For example, assuming that the video includes 30 frames of images, and the electronic device 100 obtains one frame of image every two frames of images, 12 frames of images including the object user may be obtained.

It may be understood that, in an actual application, the electronic device 100 may photograph a motion of the user through the camera 193 of the electronic device 100, to obtain the motion of the user. Alternatively, the electronic device 100 may be connected to another electronic device having a camera. In this case, the electronic device 100 may obtain a motion of the user that is photographed from the another electronic device.

In some embodiments, the image sequence A may be referred to as K1 image sequences.

S104. The electronic device 100 determines, based on the image sequence A, whether a motion of the object user matches a motion of a coach. If the matching succeeds, S105 is performed. If the matching fails, step S109 is performed.

As an example, the electronic device 100 prestores a template library including motions of the coach. The electronic device 100 first recognizes the motion of the object user based on the image sequence A, and matches the motion of the object user with a motion in the template library. That the electronic device 100 matches a motion of the object user with a motion template in a template library is matching a motion posture of the object user with a motion posture corresponding to a sequential motion clip in the template library.

Figure 10:
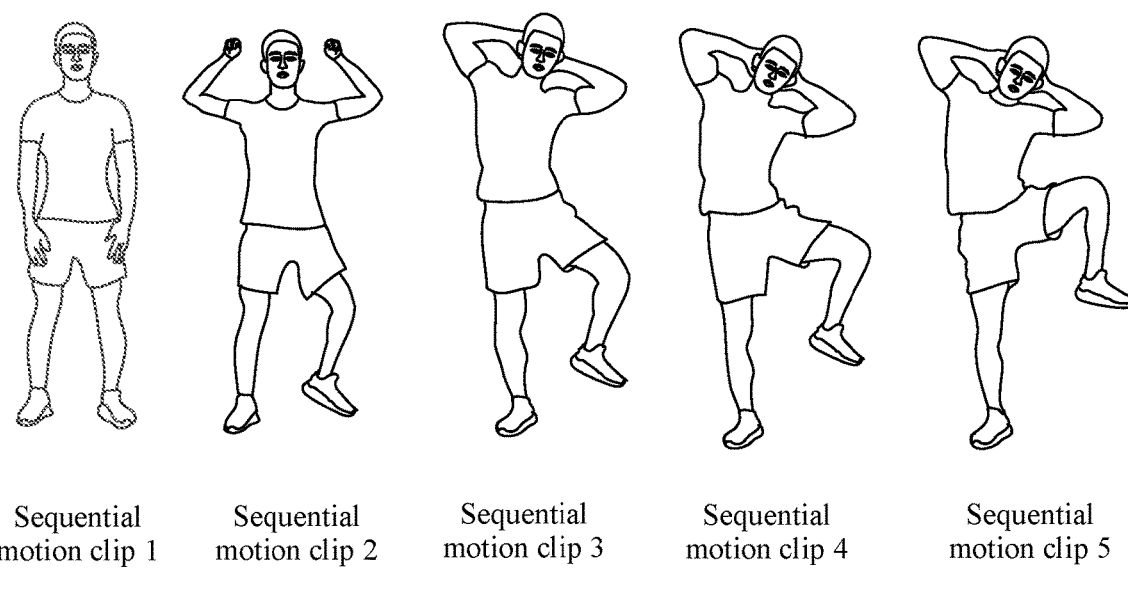
FIG. 10 is another schematic diagram of exercising of an object user according to an embodiment of this application.
Figure 10:
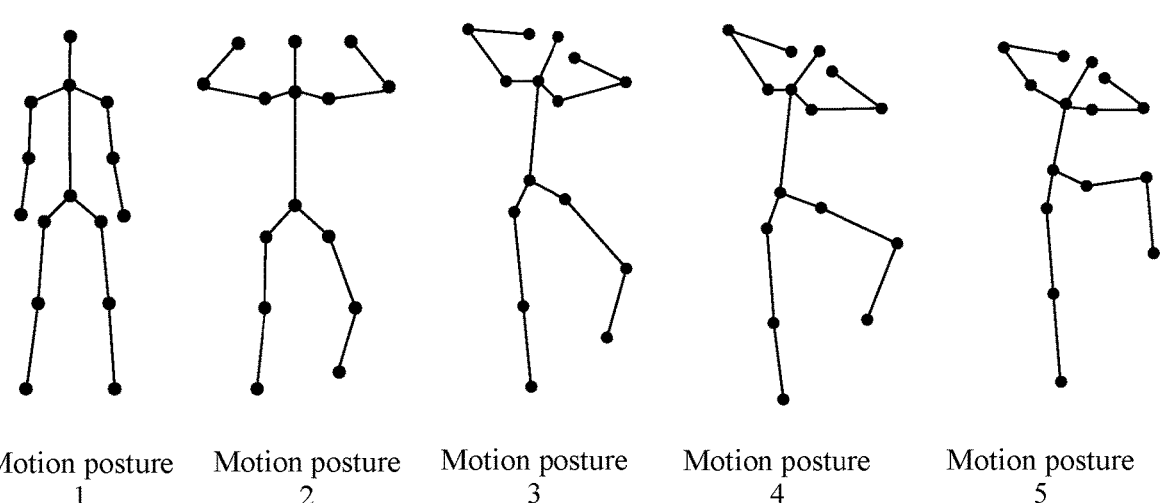

For a sequential motion clip in the template library, the electronic device 100 needs to use a human-body key point detection algorithm to obtain a motion posture corresponding to the sequential motion clip. FIG. 10 shows an example of a motion posture corresponding to a sequential motion clip. As shown in (a) in FIG. 10, there are a sequential motion 1 to a sequential motion 5. The electronic device 100 determines key points of a human body in each sequential motion clip by using a human-body key point detection algorithm, and may obtain a motion posture of the human body based on the key points of the human body. Therefore, as shown in (b) in FIG. 10, for the sequential motion clip 1 to the sequential motion clip 5, a motion posture 1 to a motion posture 5 corresponding to the sequential motion 1 to the sequential motion 5 may be obtained.

The human-body key point detection algorithm is an algorithm for detecting key points of a human body by training a neural network, and the key points of a human body may be for describing a motion posture of the human body.

Correspondingly, the electronic device 100 may recognize a plurality of motion postures of the object user based on the image sequence A by using the human-body key point detection algorithm. The image sequence A is a set including a plurality of frames of images. That the electronic device 100 obtains a plurality of motion postures of the object user based on the image sequence A means that the electronic device 100 may obtain a motion posture of the object user based on one frame of image in the image sequence A by using a human body key detection algorithm. Therefore, the plurality of motion postures of the object user may be obtained based on the image sequence A.

Figure 11:
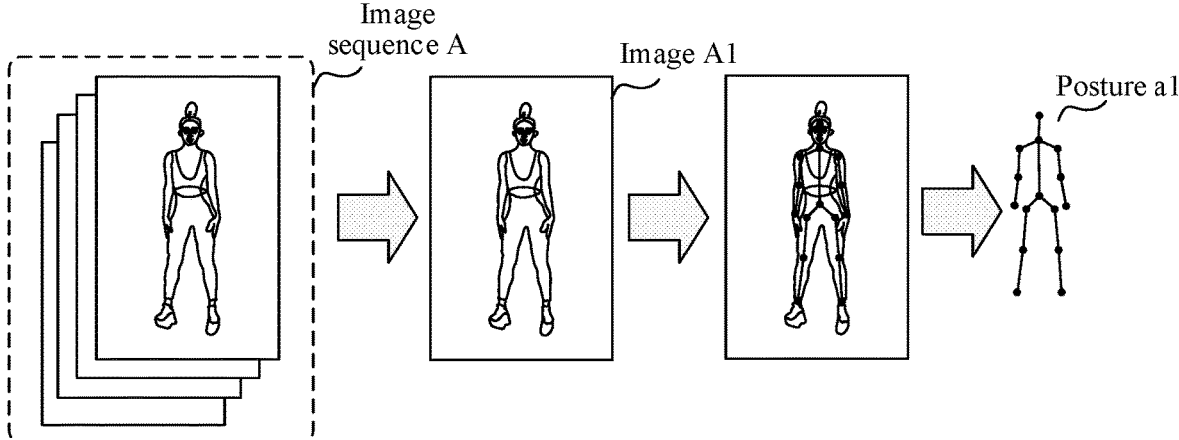
FIG. 11 is a schematic diagram of human-body skeleton key points according to an embodiment of this application.

For example, as shown in FIG. 11, the electronic device 100 obtains an image sequence A. The image sequence A includes a plurality of frames of images, and a motion posture a1 of the object user may be obtained based on one frame of image A1 in the image sequence A by using the human-body key point detection algorithm.

In some embodiments, that the electronic device 100 obtains a plurality of motion postures of the object user based on the image sequence A means that the electronic device 100 may obtain a motion posture of the object user based on one frame of image in the image sequence A by using a human body key detection algorithm. Therefore, the plurality of motion postures of the object user may be obtained based on the image sequence A.

The determining whether the motion of the object user matches the motion of the coach is: considering, when the motion postures of the object user match a preset quantity of motion postures in the template library, that the motion of the object user matches the motion of the coach, or considering, when the motion posture of the object user matches a motion posture with a starting identifier in the template library, that the motion of the object user matches the motion of the coach.

For example, using an example in which the preset quantity of the to-be-matched motion postures is 2, that the electronic device 100 determines whether the motion of the object user matches the motion of the coach includes the following steps.

1. The electronic device 100 obtains a first motion posture of the object user based on m1 frames of images.

The m1 frames of images are a plurality of frames of images in the image sequence A. The electronic device 100 recognizes skeleton key points of the object user in the m1 frames of images based on the m1 frames of images by using a human-body key point detection algorithm, to obtain a first motion posture of the object user. For details, refer to the embodiment in FIG. 11. Details are not described herein again.

2. The electronic device 100 calculates a similarity between the first motion posture and a motion posture in the template library. It is determined whether the similarity is greater than a preset value, and if the similarity is greater than a preset value, step 3 is performed.

3. The electronic device 100 obtains a second motion posture of the object user based on m2 frames of images.

The m2 frames of images are a plurality of frames of images in the image sequence A. The electronic device 100 recognizes skeleton key points of the object user in the m2 frames of images based on the m2 frames of images by using a human-body key point detection algorithm, to obtain a second motion posture of the object user. For details, refer to the embodiment in FIG. 11. Details are not described herein again.

4. The electronic device 100 calculates a similarity between the second motion posture and a motion posture in the template library. It is determined whether the similarity is greater than a preset value, and if the similarity is greater than a preset value, it is considered that the motion of the object user matches the motion of the coach.

For example, the electronic device 100 obtains an image sequence A, and obtains a motion posture a1, a motion posture a2, and a motion posture a3 based on the image sequence A. If the motion posture a1 matches a motion posture 1 in a motion posture template, the motion posture a2 matches a motion posture 2 in the motion posture template, and the motion posture a3 matches a motion posture 3 in the motion posture template, it is considered that the motion of the object user matches the motion of the coach.

That the quantity of the to-be-matched motion postures is 2 is merely an example. In an actual application, the preset quantity may alternatively be another quantity. This is not limited in this application.

In some other embodiments, when the motion posture of the object user matches a motion posture with a starting identifier in the template library, it is considered that the motion of the object user matches the motion of the coach.

For example, as shown in FIG. 10, if motion postures of the object user may match the motion posture 1 and the motion posture 2 in the template library, it is considered that the motion of the object user matches the motion of the coach.

It may be learned that in this application, the electronic device 100 prestores a motion posture template library, and the template library includes sequential motion postures of a plurality of courses. For details, refer to the descriptions in the embodiments of FIG. 10 and FIG. 3. Details are not described herein again.

In some embodiments, there may be a plurality of object users. When there are a plurality of object users, provided that the electronic device 100 detects that a motion of one of the object users matches that of the coach, the electronic device 100 considers that the object user is exercising.

S105. The electronic device 100 disables a hand gesture recognition function.

It may be understood that, that the electronic device 100 disables a hand gesture recognition function may be that the electronic device 100 no longer obtains hand gesture features of the user. That is, the electronic device 100 may obtain a hand gesture of the object user, but does not analyze the hand gesture. Alternatively, the electronic device 100 analyzes the obtained hand gesture of the object user, to obtain an instruction corresponding to the hand gesture, but the electronic device 100 does not execute the instruction.

That the electronic device 100 disables a hand gesture recognition function means that, before the electronic device 100 determines that the object user is exercising, a state of the hand gesture recognition function on the electronic device 100 is an enabled state, and when the electronic device 100 determines that the object user is exercising, the electronic device 100 disables the hand gesture recognition function, that is, switches the state of hand gesture recognition to the disabled state.

In some embodiments, before the electronic device 100 determines that the object user is exercising, a state of the hand gesture recognition function on the electronic device 100 is a disabled state, and when the electronic device 100 determines that the object user is exercising, the electronic device 100 keeps the hand gesture recognition function disabled.

When the electronic device 100 determines that the object user is exercising, the electronic device 100 disables hand gesture recognition. In this way, when the object user is exercising, the electronic device 100 disables hand gesture recognition on the user, to avoid a problem that some motions of the user during exercise easily cause hand gesture misrecognition.

S106. The electronic device 100 obtains an image sequence B including a motion of the object user.

As an example, for an operation through which the electronic device 100 obtains an image sequence B including a motion of the object user, refer to the related operation through which the electronic device 100 obtains an image sequence A including a motion of the object user in step S103.

In some embodiments, the image sequence B may be referred to as K2 image sequences.

S107. The electronic device 100 determines, based on the image sequence B, whether the object user stops exercising. If the object user stops exercising, S108 is performed. If the object user does not stop exercising, step S106 is performed.

As an example, the electronic device 100 first recognizes a motion of the object user based on the image sequence B, and matches the motion of the object user with a motion in the template library. That the electronic device 100 matches a motion of the object user with a motion template in a template library is matching a motion posture of the object user with a motion posture corresponding to a sequential motion clip in the template library.

The electronic device 100 may recognize a plurality of motion postures of the object user based on the image sequence B by using the human-body key point detection algorithm. For details, refer to the embodiment of step S104. Details are not described herein again.

That the object user stops exercising includes one or more of the following cases:

In the first case, playback of the course on the electronic device 100 ends.

As an example, when the electronic device 100 detects that playback of the fitness course ends, the electronic device 100 determines that the object user stops exercising.

In the second case, a time sequence of the user does not match a sequential motion in the course, indicating that the user may stop exercising or have a rest. That the motion of the object user does not match the sequential motion in the course means that when similarities between motion postures of the object user within a preset time and motion postures in the template are less than a preset value, or when similarities between motions of the object user in a preset quantity of frames of images and motion postures in the template library are less than a preset value, it is considered that the motion of the object user does not match the motion of the coach.

For example, when a motion of an object user matches a sequential motion clip 1 and a sequential motion clip 2, the electronic device 100 obtains 30 frames of images including the object user, and the electronic device 100 may obtain a plurality of motion postures of the object user based on the 30 frames of images including the object user. If similarities between the plurality of motion postures and the motion posture 3 are less than a preset value, it is considered that the motion of the object user does not match the motion of the coach.

Alternatively, the electronic device 100 obtains, within 1 s, 20 frames of images including the object user, and may obtain motion postures of the object user based on the 20 frames of images including the object user. If the plurality of motion postures of the object users fail to successfully match the motion posture 3, it is considered that the motion of the object user does not match the motion of the coach.

In the third case, when the motion of the object user matches a motion clip with an end identifier in the template, it is also considered that the object user stops exercising, that is, the motion of the object user ends. For example, it can be learned from FIG. 10 that the motion posture 4 and the motion posture 5 are motion postures that carry an end identifier. When another motion posture of the object user successfully matches the motion posture 4 and the motion posture 5, it is considered that the object user stops exercising.

S108. The electronic device 100 enables a hand gesture recognition function.

As an example, after the electronic device 100 determines that the motion of the object user ends, the electronic device 100 enables a hand gesture recognition function, and the electronic device 100 may normally perform hand gesture recognition on the object user.

In some optional embodiments, after the electronic device 100 enables the hand gesture recognition function, the electronic device 100 further continuously obtains motion data of the object user, and continues determining whether the object user is exercising. If subsequently detecting that the object user is exercising, the electronic device 100 disables hand gesture recognition.

In some embodiments, there may be a plurality of object users. When there are a plurality of object users, the electronic device 100 needs to detect that all the plurality of object users stop exercising, and then, the electronic device 100 enables a hand gesture recognition function.

It may be understood that in this application, before performing hand gesture recognition, the electronic device 100 needs to first determine whether the object user is exercising. When the object user is exercising, the electronic device 100 disables the hand gesture recognition function. In this way, a problem that some motions of the user during exercise may easily trigger hand gesture misrecognition can be avoided. When determining that the object user is not exercising, the electronic device 100 enables the hand gesture recognition function. In this way, when the object user needs to use the hand gesture recognition function, the user can conveniently interact with the electronic device 100 or control the electronic device 100 through a hand gesture, thereby improving user experience.

S109. The electronic device 100 determines, based on the image sequence A, whether matching with a target hand gesture succeeds. If the matching succeeds, S110 is performed. If the matching fails, step S103 is performed.

As an example, when the electronic device 100 determines that the motion of the object user fails to match the motion of the coach, it indicates that the object user is in a motion mode. In this case, hand gesture recognition may be normally performed. That is, the electronic device 100 extracts hand feature information of the object user based on the image sequence A, and recognizes a hand gesture of the object user.

S110. The electronic device 100 executes an instruction corresponding to the target hand gesture.

For example, as shown in FIG. 8, the electronic device recognizes that a fist-holding hand gesture of the user is a target hand gesture, and an instruction corresponding to the target hand gesture is a pause instruction. The electronic device displays an icon of the fist-holding hand gesture, executes the pause instruction, that is, pauses a video that is being played, and displays a pause icon.

In some optional embodiments, the electronic device 100 may further determine, based on a motion amplitude of the object user, whether the object user is exercising. When the motion amplitude of the object user is greater than a preset value, the electronic device 100 determines that the object user is exercising, and the electronic device 100 disables the hand gesture recognition function. For example, the electronic device 100 may obtain a video or image sequence including the object user, and may obtain a motion amplitude of the object user through the video or image sequence.

It should be noted that, for brief description, the foregoing method embodiment is expressed as a combination of a series of actions. However, a person skilled in the art should appreciate that the present disclosure is not limited to the described order of the actions. Next, a person skilled in the art should also appreciate that embodiments described in this specification are all preferred embodiments, and the involved actions are not necessarily required in the present disclosure.

The following describes some other embodiments provided in embodiments of this application.

In some other embodiments provided in this application, the electronic device 100 recognizes a 3D skeleton structure of a human body from an image that includes the object user and that is obtained through a camera, obtains a human body plane of the object user through fitting, then, calculates a deflection angle between the electronic device 100 and the human body plane of the object user, and adjusts, based on the deflection angle, a trigger threshold for hand gesture recognition on the object user by the electronic device 100.

Figure 12:
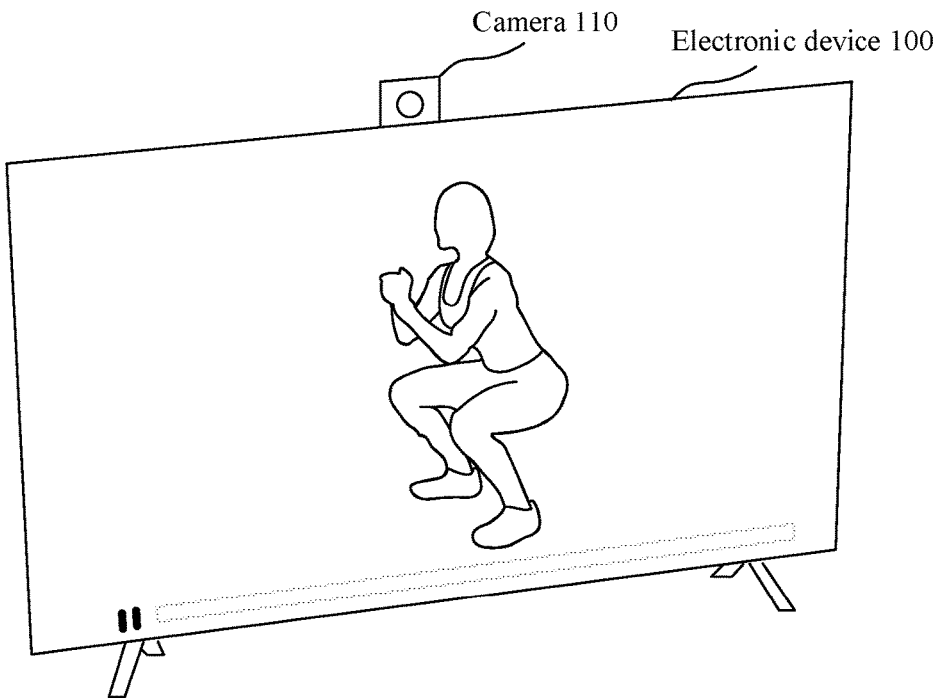
FIG. 12 is a diagram of an application scenario according to an embodiment of this application.
Figure 12:
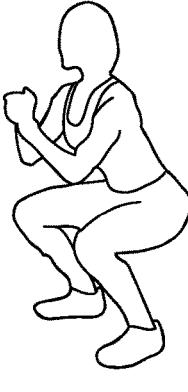
Figure 13:
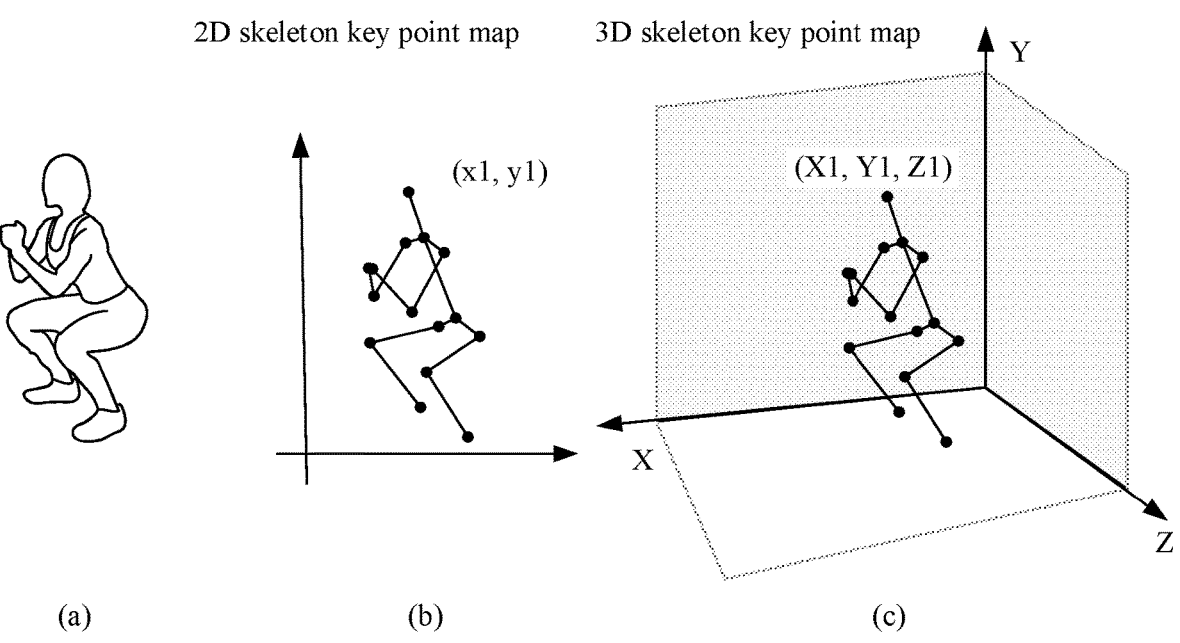
FIG. 13 is a schematic diagram of obtaining a human body plane through fitting according to an embodiment of this application.

For example, referring to FIG. 12, the object user 110 performs intelligent fitness by using the electronic device 100, and the object user is performing a "squatting" motion. FIG. 13 is a schematic diagram of a plurality of skeleton key points of an object user according to an embodiment of this application. As shown in (a) in FIG. 13, an electronic device 100 obtains, through a camera 100, an image including a "squatting" motion of the object user, and extracts 15 human-body skeleton key points of the object user based on the image by using a human-body skeleton key point algorithm. The human-body skeleton key point may be a human-body 2D skeleton key point. The 2D skeleton key point may reflect a two-dimensional spatial feature. A two-dimensional plane coordinate system is established by using a point on a plane as an origin, and (x, y) represent each key point. For example, coordinates of a key point of the head of the object user are (x1, y1). Further, the electronic device 100 may further obtain depth information of the object user. As shown in (b) in FIG. 13, the electronic device 100 obtains human-body 3D skeleton key points of the user based on the depth information of the object user and 2D skeleton key points of the object user. The human-body 3D skeleton key point may reflect a three-dimensional spatial feature, that is, each 3D skeleton key point has three-dimensional coordinates (x, y, z). For example, coordinates of a key point of the head of the object user are (x1, y1, z1). x refers to a coordinate in a horizontal axis direction of a plane on which the camera is located, y refers to a coordinate in a vertical horizontal axis direction of the plane on which the camera is located, and z refers to a coordinate in a depth axis direction of the plane on which the camera is located. As shown in (c) in FIG. 13, the electronic device 100 obtains a human body plane of the object user obtained through fitting based on 3D skeleton key points of the object user. The human body plane may be a plane determined based on key points of the two shoulders of the object user.

In some optional embodiments, the image that includes the "squatting" motion of the object user may be a depth map, and a human-body skeleton key point of the object user extracted by the electronic device 100 based on the image is a 3D skeleton key point of the object user.

In some other optional embodiments, the electronic device 100 may further obtain the human body plane of the object user through fitting based on 2D skeleton key points of the object user. A manner in which the electronic device 100 obtains the human body plane of the object user through fitting is not limited in embodiments of this application.

In embodiments of this application, after the human body plane of the object user is obtained through fitting, the electronic device 100 calculates a deflection angle between the human body plane of the object user and the plane on which the electronic device is located. The electronic device 100 adjusts, based on the deflection angle between the human body plane and the plane on which the electronic device 100 is located, a trigger threshold for hand gesture recognition.

Figure 14:
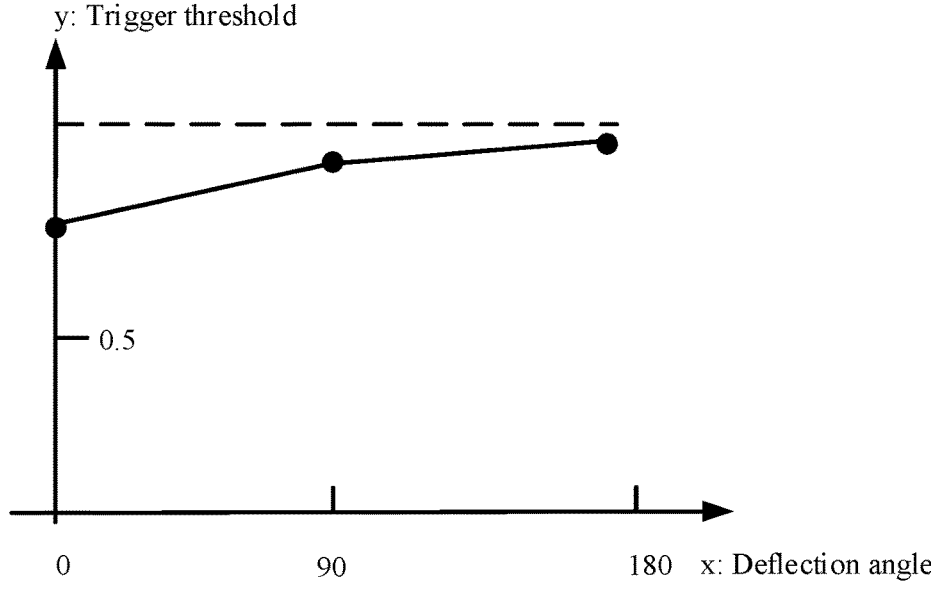
FIG. 14 is a schematic diagram of a correspondence between a deflection angle and a trigger threshold according to an embodiment of this application.

For example, FIG. 14 shows an example of the electronic device 100 based on a relationship between the trigger threshold for hand gesture recognition and the deflection angle between the human body plane and the plane on which the electronic device 100 is located. It can be learned from FIG. 13 that when the deflection angle is 0 degrees, it indicates that the user faces toward the electronic device 100. Generally, when the user faces toward the electronic device 100, it is easier for the user to control the electronic device 100 through a hand gesture. Therefore, the trigger threshold for hand gesture recognition may be set to a minimum value, for example, 0.75. When the deflection angle is 70 degrees, it indicates that the user is side facing toward the electronic device 100. In this case, the trigger threshold for hand gesture recognition may be set to be higher than the threshold whose angle is 0 degrees, for example, to 0.9. When the deflection angle is 180 degrees, it indicates that the user is facing away from the electronic device 100. In this case, a probability that the user needs hand gesture recognition is lower than that when the angle is 70 degrees. Therefore, the trigger threshold for hand gesture recognition may be set to be higher than the threshold whose angle is 70 degrees, for example, to 0.95.

For ease of description, in this application, a plane on which the electronic device 100 is located is referred to as a reference plane, and the human body plane of the object user is referred to as a human body plane.

The deflection angle between the reference plane and the human body plane is a deflection angle between a normal vector of the reference plane and a normal vector of the human body plane. Generally, there are normal vectors in two directions on one plane. In this application, a direction of the normal vector on the reference plane is a direction opposite to an orientation of the electronic device 100, and the orientation of the electronic device 100 is a direction facing toward a display. A direction of the normal vector of the human body plane is a direction of a human body orientation. In other words, the normal vector of the human body plane is consistent with the direction of the human body orientation.

Figure 15:
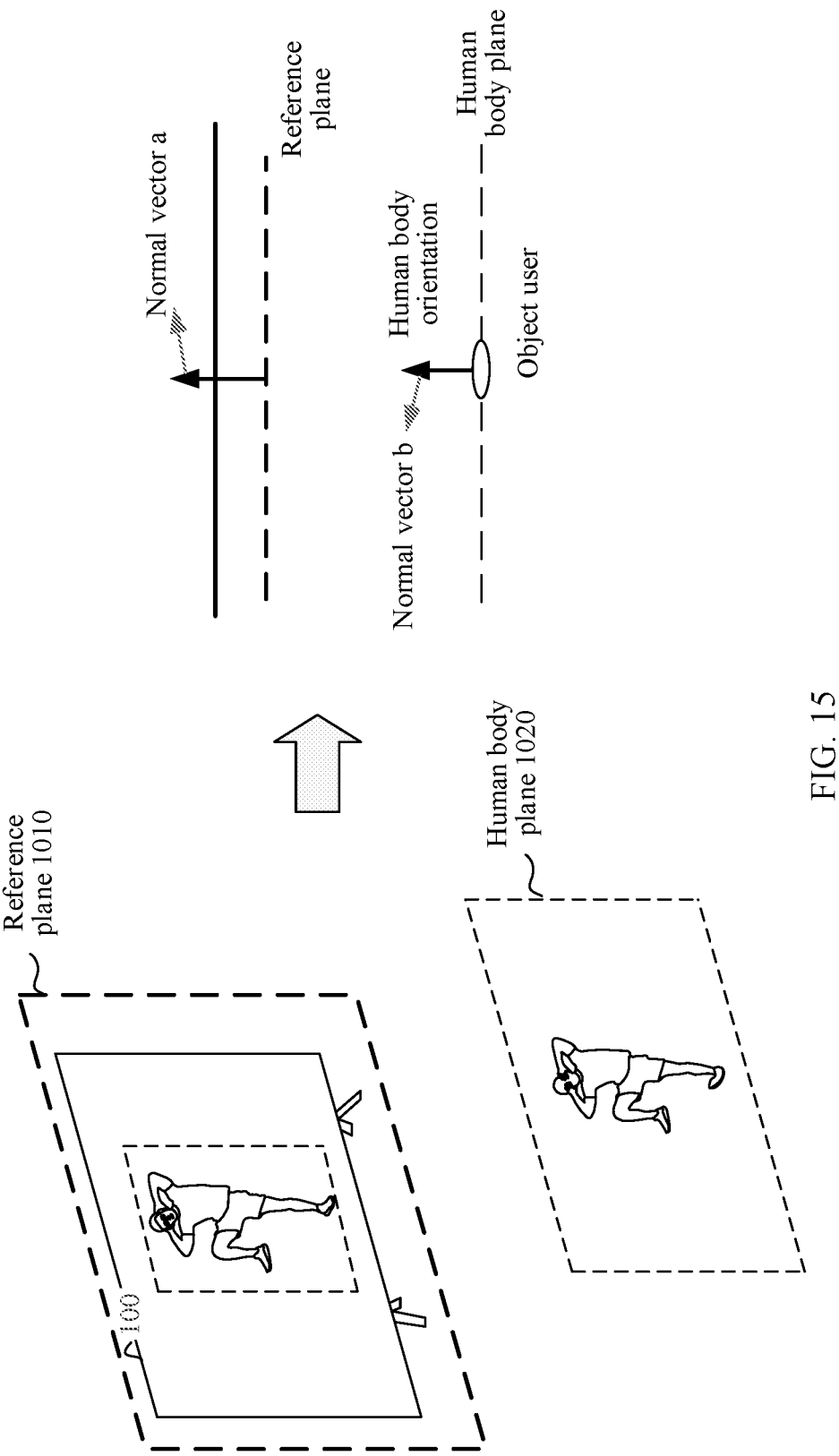
FIG. 15 is a schematic diagram of an angle between a reference plane and a human body plane according to an embodiment of this application.

For example, as shown in FIG. 15, the object user exercises while facing toward the electronic device 100, a reference plane (a plane on which the electronic device 100 is located) is 1010, a normal vector of the reference plane is a, a human body plane of the object user is 1020, and a normal vector of the human body plane is b. It can be learned that, when the object user faces toward the display, the human body plane of the object user is parallel to the reference plane, and a deflection angle between the normal vector a and the normal vector b is 0 degrees, that is, the deflection angle between the human body plane of the object user and the reference plane is 0 degrees. Generally, when the user faces toward the electronic device 100, it is easier for the user to control the electronic device 100 through a hand gesture. In this case, the electronic device 100 may set a trigger threshold for hand gesture recognition on the object user as to a first trigger threshold. For example, the first trigger threshold is set to 0.75. In this way, the electronic device 100 can easily perform hand gesture recognition.

Figure 16:
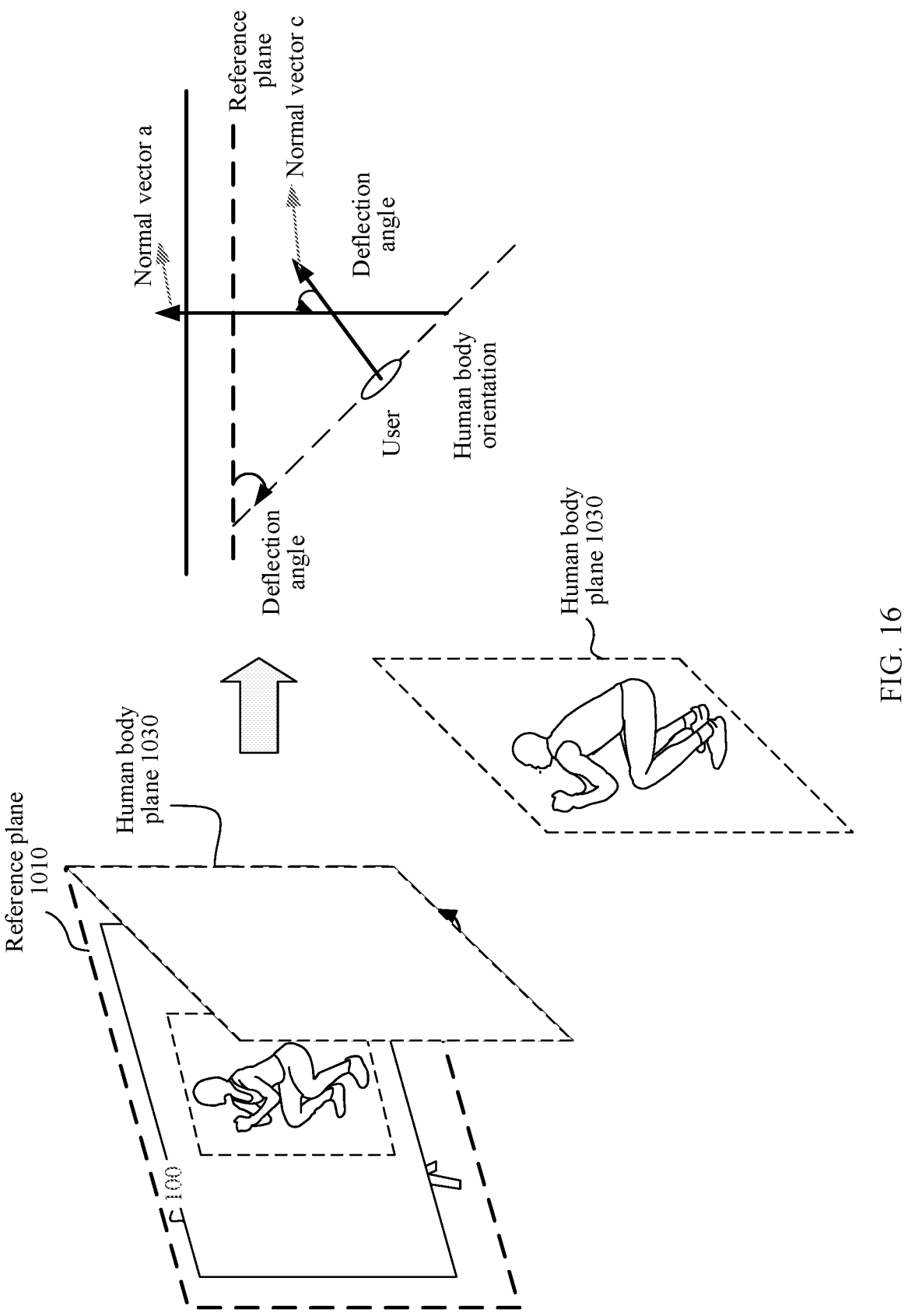
FIG. 16 is a schematic diagram of another angle between a reference plane and a human body plane according to an embodiment of this application.

Referring to FIG. 16, an object user is exercising sideways relative to the electronic device 100. A human body orientation of the object user is facing away from a side of the electronic device 100. A reference plane (a plane on which the electronic device 100 is located) is 1010, a normal vector of the reference plane is a, a human body plane of the object user is 1020, and a normal vector of the human body plane is d. It may be learned that, in this case, a deflection angle is presented between the human body plane of the object user and the reference plane. For example, a deflection angle between the normal vector a and the normal vector d is 130 degrees, that is, a deflection angle between the human body plane of the object user and the reference plane is 130 degrees. Generally, when the user side faces toward the electronic device 100, a probability that the user controls the electronic device 100 through a hand gesture is relative to a probability when the user faces toward the electronic device 100. Therefore, in this case, the electronic device 100 may set a trigger threshold for hand gesture recognition on the object user to be higher, for example, may be set to 0.9.

Figure 17:
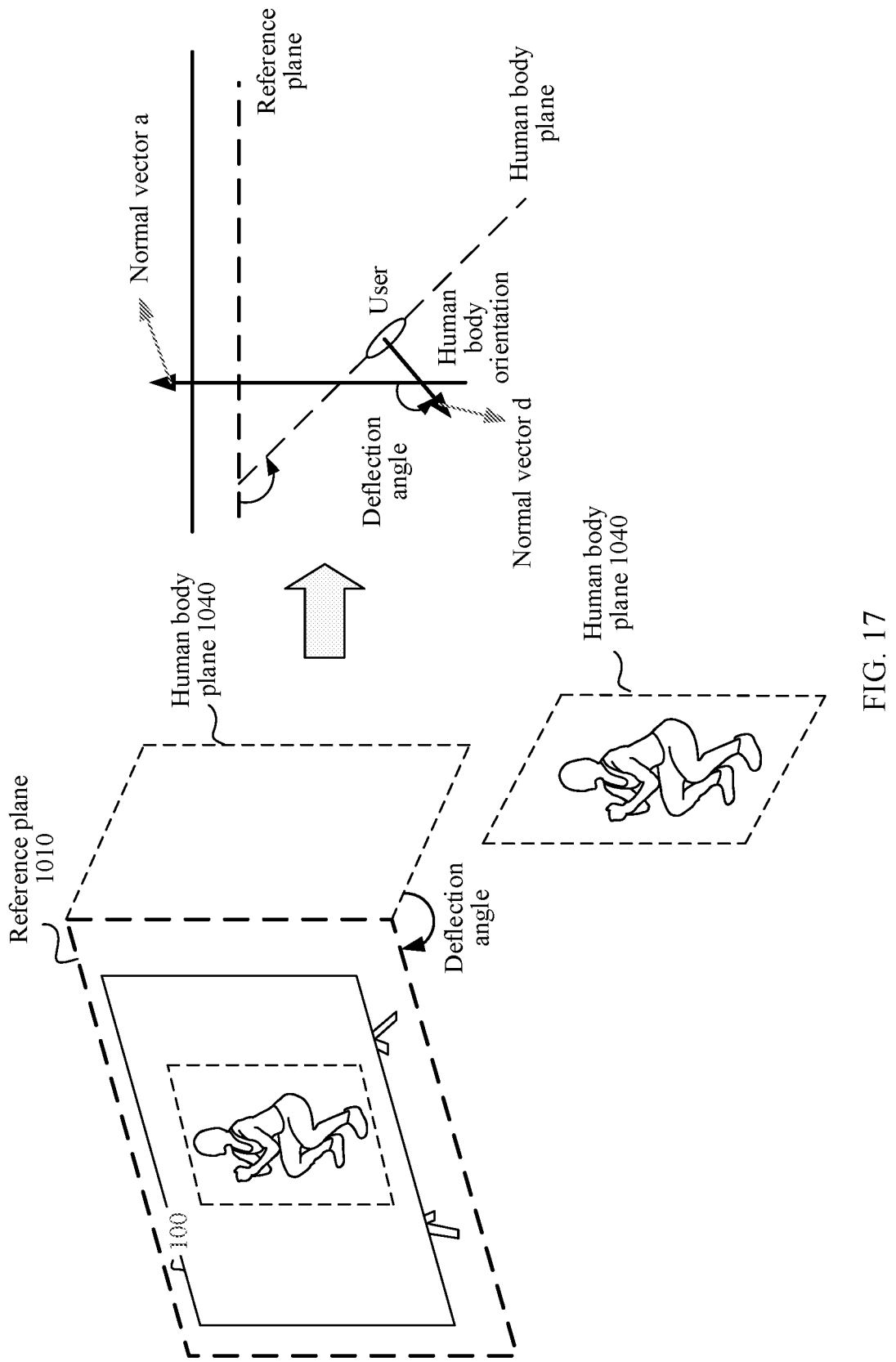
FIG. 17 is a schematic diagram of another angle between a reference plane and a human body plane according to an embodiment of this application.

Referring to FIG. 17, an object user is exercising sideways relative to the electronic device 100. A human body orientation of the object user is facing toward a side of the electronic device 100. A reference plane (a plane on which the electronic device 100 is located) is 1010, a normal vector of the reference plane is a, a human body plane of the object user is 1020, and a normal vector of the human body plane is c. It may be learned that, when the object user side faces toward the display, a deflection angle is presented between the human body plane of the object user and the reference plane. For example, a deflection angle between the normal vector a and the normal vector c is 70 degrees, that is, a deflection angle between the human body plane of the object user and the reference plane is 70 degrees. Generally, when the user side faces toward the electronic device, a probability that the user controls the electronic device 100 through a hand gesture is relative to a probability when the user faces toward the electronic device 100. Therefore, in this case, the electronic device 100 may set a trigger threshold for hand gesture recognition on the object user to a second trigger threshold. The second trigger threshold is greater than the first trigger threshold, and for example, may be set to 0.9.

It may be understood that before the electronic device 100 enters the fitness mode, the electronic device 100 needs to determine the object user, obtain an operation entered by the object user, and enable the fitness mode. For related operations through which the electronic device 100 determines the object user and enables the fitness mode, refer to related operations through which the electronic device 100 determines the object user and enables the fitness mode in Embodiment 1. Details are not described herein again.

With reference to FIG. 2A, the following describes another method for preventing hand gesture misrecognition provided in embodiments of this application.

The method may be implemented by the electronic device 100 shown in FIG. 2A. FIG. 18 is a flowchart of another method for preventing hand gesture misrecognition according to an embodiment of this application. As shown in FIG. 18, the method for preventing hand gesture misrecognition includes some or all of the following steps.

S201. An electronic device 100 determines an object user.

Figure 9:
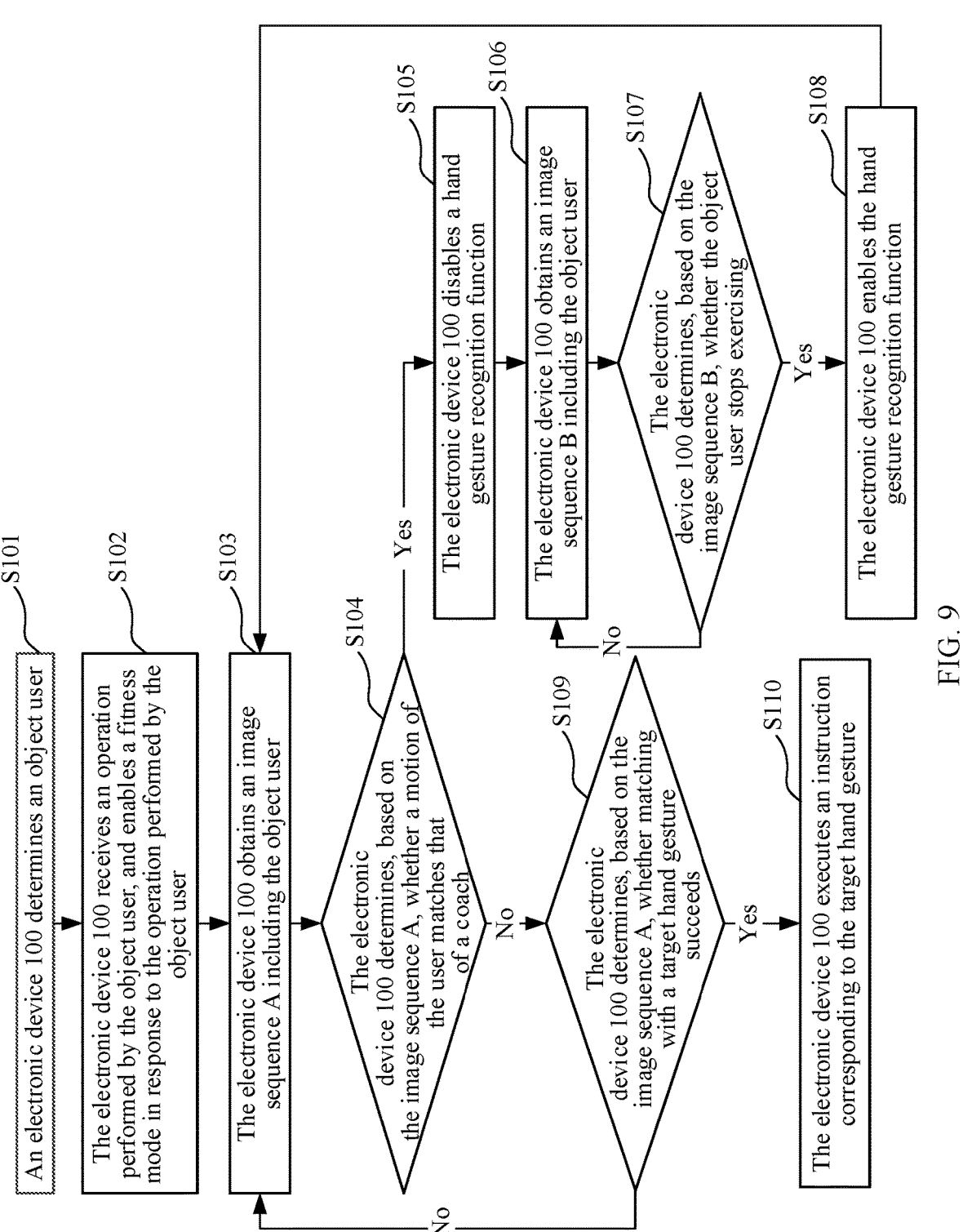
FIG. 9 is a flowchart of a method for preventing hand gesture misrecognition according to an embodiment of this application.

As an example, for that the electronic device 100 determines a user as the object user, refer to the operations through which the electronic device 100 determines the user as the object user in step S101 in the embodiment of FIG. 9. Details are not described herein again.

S202. The electronic device 100 receives an operation performed by the object user, and enables a fitness mode in response to the operation of the object user.

As an example, for a manner in which the electronic device 100 enables a fitness mode, refer to the manner in which the electronic device 100 enables the fitness mode in step S102 in the embodiment of FIG. 9. Details are not described herein again.

S203. The electronic device 100 obtains graphic information including the object user.

The graphic information includes a plurality of frames of images photographed by the electronic device 100 through the camera 110 and depth information of the object user. Each frame of image in the plurality of frames of images includes the object user. In embodiments of this application, the plurality of frames of images may be referred to as a first image.

In some embodiments, the graphic information further includes a depth map, and a grayscale value of each pixel in the depth map represents a depth value. In embodiments of this application, the depth map may be referred to as a second image.

In some embodiments, the camera may be a structured light camera module. The structured light camera module includes a light projector and two cameras (for example, a first camera and a second camera). The optical projector is configured to transmit optical information to the object user. The first camera and the second camera are configured to photograph the object user. The first camera and the second camera may also be referred to as a binocular camera. The electronic device 100 may calculate the depth information of the object user based on images of the object user collected by the binocular camera. The depth information of the object user may represent a three-dimensional feature of the object user.

In some other embodiments, the electronic device 100 may obtain distance between key points of the object user and the electronic device 100 through a range sensor (for example, the range sensor 380F). The range sensor is configured to measure a distance. The range sensor is configured to transmit and receive infrared or laser light, and the electronic device 100 may measure a distance based on the infrared or the laser light (for example, energy of the infrared or the laser light) received by the range sensor. The depth information of the object user may be obtained based on distances between the key points and the electronic device 100.

S204. The electronic device 100 determines a human body plane of the object user based on the graphic information.

As an example, the electronic device 100 may obtain, based on the graphic information by using a human skeleton detection algorithm, a plurality of skeleton key points of the object user in each frame of image in the graphic information. The human-body skeleton key points represent human-body skeleton information, and may be for describing a human body posture. Then, the human body plane of the object user may be obtained through fitting based on the human-body skeleton key points.

In some optional embodiments, the electronic device 100 may first obtain, based on one frame of image in the graphic information, where the image is a two-dimensional image, for example, an RGB image, 2D skeleton key points of the object user in the graphic information by using a human-body skeleton key point detection method, and then obtain human-body 3D skeleton key points with reference to depth information corresponding to the object user in the image, to obtain a human body plane through fitting.

In some embodiments, this application is not limited to the foregoing manner of obtaining the human body plane of the object user through fitting. The electronic device 100 may further directly obtain a depth map including the object user, obtain 3D skeleton key points of the object user based on the depth map, and obtain the human body plane of the object user through fitting. A manner of obtaining the human body plane through fitting is not limited in this application.

S205. The electronic device 100 calculates a deflection angle between the human body plane of the object user and a reference plane.

A plane on which the electronic device 100 is located is defined as a reference plane. Calculating a deflection angle between the human body plane and the reference plane may include: The electronic device 100 photographs an image including the object user through the camera, and the electronic device 100 may obtain, based on the image, a deflection angle between the human body plane of the object user and the camera of the electronic device 100. There is an angle of a fixed parameter between the camera and the electronic device 100. In this way, the deflection angle between the human body plane and the plane on which the electronic device 100 is located, that is, the deflection angle between the human body plane and the reference plane, may be calculated.

For example, that the electronic device 100 obtains a deflection angle between a human body plane and a reference plane is described by using an example in which an angle between the camera and the electronic device 100 is 0 degrees. When obtaining an image including an object user through the camera, the electronic device 100 establishes a camera coordinate system O-X-Y-Z by using a center of the camera as an origin. In the camera coordinate system O-X-Y-Z, a plane XOY is parallel to a display of the electronic device 100, an X axis is established in a horizontal direction, a Y axis is established in a vertical direction, and a Z axis is established in a direction perpendicular to the plane XOY. Location coordinates of the object user in the camera coordinate system in the image may be obtained, and then the location coordinates of the object user in the image in the camera coordinate system may be converted into location coordinates in the world coordinate system through coordinate system conversion. In the world coordinate system, a deflection angle between the object user plane and the electronic device 100 may be calculated. The foregoing calculation of the deflection angle between the human body plane and the reference plane is merely an example. In an actual application, another calculation method may also be used. The calculation of the deflection angle between the human body plane and the reference plane is not limited in embodiments of this application.

The deflection angle between the human body plane of the object user and the reference plane is a deflection angle between a normal vector of the human body plane and a normal vector of the reference plane. Generally, there are normal vectors in two directions on one plane. In this application, a direction of the normal vector on the reference plane is a direction opposite to an orientation of the electronic device 100, and the orientation of the electronic device 100 is a direction facing toward a display of the electronic device 100. A direction of the normal vector of the human body plane is a direction of a human body orientation. In other words, the normal vector of the human body plane is consistent with the direction of the human body orientation. For determining the deflection angle between the human body plane of the object user and the reference plane, refer to the embodiments in FIG. 11 to FIG. 14. Details are not described herein again. In embodiments of this application, the normal vector of the human body plane may be referred to as a first normal vector, and the normal vector of the reference plane may be referred to as a second normal vector.

The human body orientation may be determined based on one or more of the following methods:

1. The electronic device 100 determines an orientation of the face of the object user in the world coordinate system as the human body orientation. As an example, the electronic device 100 may obtain a head image of the human body of the object user from a depth map, and then the electronic device 100 may determine an orientation of the face in a human body posture in the world coordinate system based on the head image.

2. The electronic device 100 may determine a human body orientation of the object user based on the left shoulder contour and the right shoulder contour of the object user. For example, the electronic device 100 is based on graphic information including the object user. Based on the graphic information, the electronic device 100 may recognize the left-shoulder contour and the right-shoulder contour of the object user. When the electronic device 100 obtains the left-shoulder contour of the object user, but does not obtain the right-shoulder contour of the object user, it indicates that the human body orientation of the object user is a right direction. When the electronic device 100 obtains the right-shoulder contour of the object user, but does not obtain the right-shoulder contour of the object user, it indicates that the human body orientation of the object user is a left direction. If both the left shoulder contour and the right shoulder contour are obtained, but the left shoulder contour is located on the outer side relative to the right shoulder contour, the human body orientation is between the left direction and a front direction.

3. The electronic device 100 may determine a human body orientation of the object user based on features of the left hand and the right hand of the object user. As an example, the electronic device 100 obtains hand features of the object user, and analyzes the hand features, to recognize the left hand and the right hand of the object user. For example, when the object user faces toward the electronic device 100, and the left hand of the object user is in a left direction, the human body orientation of the object user is facing toward the electronic device 100. When the object user faces away from the electronic device 100, and the left hand of the object user is in a right direction, the human body orientation of the object user is facing away from the electronic device 100.

The foregoing manner of determining the human body orientation is merely an example. In an actual application, the manner of determining the human body orientation may alternatively be another manner. This is not limited in this application.

S206. The electronic device 100 adjusts a trigger threshold for hand gesture recognition based on the deflection angle between the human body plane of the object user and the reference plane.

The trigger threshold may be for measuring whether the hand gesture of the user is similar to the target hand gesture. As an example, when a similarity between the hand gesture of the user and the target hand gesture reaches a specific threshold, the electronic device 100100 considers that the hand gesture of the user and the object user are a same hand gesture, and the electronic device 100100 executes an instruction corresponding to the hand gesture. The threshold is a trigger threshold for hand gesture recognition.

As an example, when the deflection angle between the human body plane of the object user and the reference plane increases, the trigger threshold for hand gesture recognition is adjusted up, and when the deflection angle between the human body plane of the object user and the reference plane decreases, the trigger threshold for hand gesture recognition is adjusted down.

For example, referring to FIG. 11, FIG. 11 shows an example of a relationship between a deflection angle between a human body plane of an object user and a reference plane and a trigger threshold for hand gesture recognition. For example, when the deflection angle between the human body plane of the object user and the reference plane is 0 degrees, the trigger threshold for hand gesture recognition may be 0.75. In another example, when the deflection angle between the human body plane of the object user and the reference plane is 70 degrees, the trigger threshold for hand gesture recognition may be 0.9. That is, when the deflection angle between the human body plane of the object user and the reference plane is 70 degrees, and a similarity between a hand gesture of the object user and a target hand gesture is greater than or equal to 0.9, the electronic device 100 considers that the hand gesture of the object user is consistent with the target hand gesture, and the electronic device 100 executes an instruction corresponding to the target hand gesture.

In some optional solutions, when the deflection angle between the human body plane and the reference plane is greater than a preset angle value, the electronic device 100 disables hand gesture recognition. For example, when the deflection angle between the human body plane and the reference plane is greater than 90 degrees, the electronic device 100 disables hand gesture recognition.

It may be understood that the correspondence between the deflection angle between the human body plane of the object user and the reference plane and the trigger threshold for hand gesture recognition is merely an example. In an actual application, the correspondence may be another correspondence. This is not limited in this application.

It should be noted that, for brief description, the foregoing method embodiment is expressed as a combination of a series of actions. However, a person skilled in the art should appreciate that the present disclosure is not limited to the described order of the actions. Next, a person skilled in the art should also appreciate that embodiments described in this specification are all preferred embodiments, and the involved actions are not necessarily required in the present disclosure.

According to the context, the term "when" used in the foregoing embodiments may be interpreted as a meaning of "if", "after", "in response to determining", or "in response to detecting". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. An electronic device, comprising:
one or more processors; and
one or more memories coupled to the one or more processors and configured to store computer program code, the computer program code comprising computer instructions that, when executed by the one or more processors, cause the electronic device to perform:
detecting an object user;
collecting a first plurality of image sequences comprising the object user through a camera;
setting a state of a hand gesture recognition function to a disabled state when determining that the object user is exercising in accordance with the first plurality of image sequences and a plurality of motion clips associated with an exercise;
collecting a second plurality of image sequences comprising the object user through the camera; and
setting the state of the hand gesture recognition function to an enabled state when determining that the object user completes exercising in accordance with the second plurality of image sequences and the plurality of motion clips associated with the exercise.

2. The electronic device of claim 1, wherein the computer instructions, when executed by the one or more processors, further cause the electronic device to perform:
obtaining a human body plane of the object user based on the first plurality of image sequences;
calculating a deflection angle between the human body plane and a reference plane, wherein the reference plane is a plane on which the electronic device is located; and
setting a state of a hand gesture recognition function to the disabled state when the deflection angle is greater than a first threshold.

3. The electronic device of claim 1, wherein the computer instructions, when executed by the one or more processors, further cause the electronic device to perform:
obtaining a face feature of a user based on a plurality of images collected by the camera of the electronic device;
comparing the face feature with prestored face information;
determining that the user is the object user when the face feature matches the prestored face information.

4. The electronic device of claim 1, wherein the electronic device is further enabled to perform:
recognizing a motion corresponding to a user based on a plurality of images collected by the camera of the electronic device;
determining that the user is the object user when the motion matches a second preset motion.

5. A method for preventing hand gesture misrecognition, comprising:
detecting, by an electronic device, an object user;
collecting, by the electronic device, a first plurality of image sequences comprising the object user through a camera;
setting, by the electronic device, a state of a hand gesture recognition function to a disabled state when determining that the object user is exercising in accordance with the first plurality of image sequences and a plurality of motion clips associated with an exercise;
collecting a second plurality of image sequences comprising the object user through the camera; and
setting the state of the hand gesture recognition function to an enabled state when determining that the object user completes exercising in accordance with the second plurality of image sequences and the plurality of motion clips associated with the exercise.

6. The electronic device of claim 1, wherein before collecting the first plurality of image sequences, the computer instructions, when executed by the one or more processors, further cause the electronic device to perform:
displaying the plurality of motion clips associated with the exercise on a display of the electronic device.

7. The electronic device of claim 6, wherein when the state of the hand gesture recognition function is set to the enabled state, the electronic device is further caused to perform:
detecting a hand gesture of the object user that matches a target hand gesture in accordance with a deflection angle between a human body plane of the object user and a reference plan, and a trigger threshold for hand gesture recognition, wherein the reference plane is a plane on which the electronic device is located, wherein the trigger threshold is for measuring whether the hand gesture of the object user is similar to the target hand gesture, wherein the trigger threshold is determined based on the deflection angle and is increased over an increase of the deflection angle.

8. The method of claim 5, the method further comprising:

obtaining, by the electronic device, a human body plane of the object user based on the first plurality of image sequences;

calculating, by the electronic device, a deflection angle between the human body plane and a reference plane, wherein the reference plane is a plane on which the electronic device is located; and setting, by the electronic device, a state of a hand gesture recognition function to the disabled state when the deflection angle is greater than a first threshold.

9. The method of claim 5, wherein before collecting the first plurality of image sequences, the method further comprises:

displaying, by the electronic device, the plurality of motion clips associated with the exercise on a display of the electronic device.

10. The method of claim 5, wherein when the state of the hand gesture recognition function is set to the enabled state, the method further comprises:

detecting, by the electronic device, a hand gesture of the object user that matches a target hand gesture in accordance with a deflection angle between a human body plane of the object user and a reference plan, and a trigger threshold for hand gesture recognition, wherein the reference plane is a plane on which the electronic device is located, wherein the trigger threshold is for measuring whether the hand gesture of the object user is similar to the target hand gesture, wherein the trigger threshold is determined based on the deflection angle and is increased over an increase of the deflection angle.

11. A non-transitory computer-readable medium having computer instructions that, when executed by a processor of an electronic device, cause the electronic device to execute operations comprising:

detecting an object user;

collecting a first plurality of image sequences comprising the object user through a camera;

setting a state of a hand gesture recognition function to a disabled state when determining that the object user is exercising in accordance with the first plurality of image sequences and a plurality of motion clips associated with an exercise;

collecting a second plurality of image sequences comprising the object user through the camera; and setting the state of the hand gesture recognition function to an enabled state when determining that the object user completes exercising in accordance with the second plurality of image sequences and the plurality of motion clips associated with the exercise.

12. The method of claim 11, wherein the electronic device is further caused to perform:

obtaining a human body plane of the object user based on the first plurality of image sequences;

calculating a deflection angle between the human body plane and a reference plane, wherein the reference plane is a plane on which the electronic device is located; and setting a state of a hand gesture recognition function to the disabled state when the deflection angle is greater than a first threshold.

13. The non-transitory computer-readable medium of claim 11, wherein before collecting the first plurality of image sequences, the computer instructions, when executed by the processor, further cause the electronic device to perform:

displaying the plurality of motion clips associated with the exercise on a display of the electronic device.

14. The non-transitory computer-readable medium of claim 11, wherein when the state of the hand gesture recognition function is set to the enabled state, the electronic device is further caused to perform:

detecting a hand gesture of the object user that matches a target hand gesture in accordance with a deflection angle between a human body plane of the object user and a reference plan, and a trigger threshold for hand gesture recognition, wherein the reference plane is a plane on which the electronic device is located, wherein the trigger threshold is for measuring whether the hand gesture of the object user is similar to the target hand gesture, wherein the trigger threshold is determined based on the deflection angle and is increased over an increase of the deflection angle.

* * * * *